US012173458B2

(12) United States Patent
Zwerenz et al.

(10) Patent No.: US 12,173,458 B2
(45) Date of Patent: Dec. 24, 2024

(54) LIFT DRIVE FOR A RAIL-GUIDED CANTILEVER CONSTRUCTION DEVICE

(71) Applicant: PERI SE, Weissenhorn (DE)

(72) Inventors: Andre Zwerenz, Oy-Mittelberg (DE); Julian Huber, Merklingen (DE)

(73) Assignee: PERI SE, Weissenhorn (DE)

( * ) Notice: Subject to any disclaimer, the term of this patent is extended or adjusted under 35 U.S.C. 154(b) by 340 days.

(21) Appl. No.: 17/433,115

(22) PCT Filed: Feb. 18, 2020

(86) PCT No.: PCT/DE2020/100112
§ 371 (c)(1),
(2) Date: Aug. 23, 2021

(87) PCT Pub. No.: WO2020/169149
PCT Pub. Date: Aug. 27, 2020

(65) Prior Publication Data

US 2022/0195678 A1 Jun. 23, 2022

(30) Foreign Application Priority Data

Feb. 22, 2019 (DE) ..................... 10 2019 104 548.7

(51) Int. Cl.
*E01D 21/10* (2006.01)
*B66F 3/24* (2006.01)
(Continued)

(52) U.S. Cl.
CPC ................ *E01D 21/10* (2013.01); *B66F 3/24* (2013.01); *E04G 3/34* (2013.01); *E04G 11/28* (2013.01); *E04G 2003/283* (2013.01)

(58) Field of Classification Search
CPC ... E01D 21/10; B66F 3/24; E04G 3/34; E04G 2003/283; E04G 11/28; E04G 11/24
See application file for complete search history.

(56) References Cited

U.S. PATENT DOCUMENTS

2009/0146041 A1* 6/2009 Schwoerer .............. E04G 11/20
249/20
2013/0341125 A1* 12/2013 Meldner ................... E04G 3/28
182/129

(Continued)

FOREIGN PATENT DOCUMENTS

CN 101200259 A 6/2008
CN 106836012 6/2017

(Continued)

OTHER PUBLICATIONS

PRODUCT | Peri Balanced Cantilever Carriage VBC Variokit (EN); found at: https://www.youtube.com/watch?v=b0N3HsFM7oM&t=1s (Year: 2020).*

(Continued)

*Primary Examiner* — Mahdi H Nejad
(74) *Attorney, Agent, or Firm* — SLEMAN & LUND LLP

(57) ABSTRACT

A lift drive for a rail-guided cantilever construction device. The cantilever construction device comprises a main frame guided by at least one rail for receiving at least one formwork. The lift drive comprises a lift device, a first end of the lift device is designed to be connected to the main frame, and a second lift device end opposite the first end can be moved relative to the main frame when the first end of the lift device is connected to the main frame; a first fixing device connected to the first end of the lift device and designed to fix the first end of the lift device with respect to the at least one rail; and a second fixing device connected to the second end of the lift device and designed to fix the second end of the lift device with respect to the at least one rail.

17 Claims, 12 Drawing Sheets

(51) Int. Cl.

| | |
|---|---|
| ***E04G 3/34*** | (2006.01) |
| ***E04G 11/28*** | (2006.01) |
| *E04G 3/28* | (2006.01) |

(56) References Cited

U.S. PATENT DOCUMENTS

| | | | | |
|---|---|---|---|---|
| 2014/0284141 | A1* | 9/2014 | Tichell Fortea | E01D 4/00<br>182/36 |
| 2014/0305070 | A1* | 10/2014 | Jin | E04B 2/84<br>52/742.14 |
| 2016/0115659 | A1* | 4/2016 | Tichell Fortea | E01D 21/10<br>425/63 |
| 2020/0332539 | A1* | 10/2020 | Deifel | E04G 11/28 |
| 2022/0195678 | A1* | 6/2022 | Zwerenz | E04G 3/34 |
| 2022/0325541 | A1* | 10/2022 | Schmid | E04G 3/20 |
| 2023/0358060 | A1* | 11/2023 | Brunner | E04G 11/28 |

FOREIGN PATENT DOCUMENTS

| | | |
|---|---|---|
| DE | 2919565 | 11/1979 |
| DE | 102007047443 | 4/2009 |

OTHER PUBLICATIONS

CVS Cantilever Formwork Carriage—ULMA Construction [en]; found at: https://www.youtube.com/watch?v=vHNdPoBZ484 (Year: 2017).*

Climbing for Concreting a Wall of a Building; Document ID: At 503924 B1; Inventor Name: Mathis Hugo, Dipl Ing Mag, Marte Guenter; Date Published: Feb. 15, 2008; Date Filed: Aug. 18, 2006 (Year: 2008).*

Lift Drive For A Rail-guided Climbing System; Document ID: DE 102018117727 A1; Nventor Name: Schmid J Shmid I; Date Published: Jan. 23, 2020 (Year: 2020).*

A Basket Automatic Advancement Device; Document ID: CN 106836012 A; Inventor Name: Tian, Ji-yuan Tang, Xu; Date Published: Jun. 13, 2017; Date Filed: Mar. 14, 2017 (Year: 2017).*

Method For Lowering Formwork And Protection Element During Processing Of Multi-storey Building; Document ID: EP 2995749 A1; Inventor Name: Amon P, Neumann C; Date Published: Mar. 16, 2016; (Year: 2016).*

User Guide Cantilever Carriage CVS 200—ULMA; found at https://www.acrow.com.au/wp-content/uploads/2021/06/UG_CVS_EN.pdf; retrieved on or after Jan. 30, 2024; publication date not known.

* cited by examiner

LIFT DRIVE FOR A RAIL-GUIDED CANTILEVER CONSTRUCTION DEVICE

FIELD OF THE INVENTION

The invention relates to a lift drive for a rail-guided cantilever construction device, in particular for use in bridge construction, wherein the cantilever construction device comprises a main frame which is guided by at least one rail for receiving at least one formwork. The invention also relates to a rail-guided cantilever construction device comprising a lift drive, according to any of the preceding claims, and a method for moving a rail-guided cantilever construction device, in particular for use in bridge construction, with this lift drive.

BACKGROUND OF THE INVENTION

A previously known lift drive with a hydraulic cylinder is described in the German patent application DE 10 2007 047 443 A1 relating to a formwork arrangement for the cantilever construction of bridges. Cantilever construction devices are used, for example, in the construction of bridges. The cantilever construction devices are usually moved on rails, for example, from a bridge pier that has already been concreted in order to then continue concreting the bridge. If there is even a slight slope or bridge inclination, the cantilever construction device can start moving in an uncontrolled manner and, in the worst case, fall. Especially when building bridges where bridge inclinations of more than 2° occur in such a way that the cantilever construction device starts moving independently on the rail, an uncontrolled movement of the cantilever construction device, which harbors the risk of the cantilever construction device falling completely, must be avoided.

So far, an uncontrolled movement of the cantilever construction device has been prevented by a self-locking of the movement of the cantilever construction device due to a given friction value of a roller or antifriction bearing over which the cantilever construction device is guided on the respective rail that occurs up to an approved longitudinal inclination of bridges of less than 2°. The coefficient of friction can be increased by adding wooden wedges between the rail and the rollers of the roller bearing. An uncontrolled movement of the cantilever construction device can be prevented as well by using slide bearings with a defined high coefficient of friction instead of roller bearings. In the above-mentioned DE 10 2007 047 443 A1, this solution is used in the form of a largely horizontal slide bearing that comprises at least one bearing part made of plastic. The use of slide bearings is considered to be advantageous compared to the roller bearings used up to now since, when using roller bearings, there is a risk, even if the bridge radii are small, that the rollers will get out of the rail provided for them and, for example, run into flanges or the like (para. [0007], lines 1-10).

The disadvantage of the slide bearing solution, however, is that the value of the coefficient of friction depends on factors influencing the friction. For example, if there is ice, oil, dirt and/or water on the contact points of the slide bearing components sliding on each other, the friction can be reduced to such an extent that the required braking effect is no longer guaranteed. The components sliding on each other are subject to wear that is higher than that of a roller or antifriction bearing. In addition, with a slide bearing, which has a targeted higher friction compared to a roller or antifriction bearing, a greater force is required for the roller or antifriction bearing to move the cantilever construction device, which makes, for example, the use of more powerful, i.e., usually larger hydraulic units/cylinders, necessary. Slide bearings are also limited in their inclination if the downhill force of the cantilever construction device is greater than the frictional force caused by the slide bearing. Roller or antifriction bearings, on the other hand, can only be replaced if the inclination is small, and when the wooden blocks are manually applied and/or removed to increase or reduce the friction of the bearing, the operator is in the danger area of the cantilever construction device, i.e., in the worst case, he can be caught by the device. The disadvantages of both solutions apply to both a forward travel of the cantilever construction device in the direction of a construction portion to be concreted and to a reverse travel.

SUMMARY OF THE INVENTION

The object of the present invention, on the other hand, is to provide a lift drive for a rail-guided cantilever construction device that enables the cantilever construction device to be moved safely with little friction and without the risk of an uncontrolled movement of the cantilever construction device, especially when the structure is inclined by more than 2°. In addition, a simple and compact lift drive is to be provided with which the cantilever construction device can be safely moved both forward and backward so that the lift drive or the cantilever construction device does not need to be converted, and a person is not in the immediate danger area of the lift drive or the cantilever construction device.

This object is achieved by a lift drive and a method for moving a rail-guided cantilever construction device.

The object according to the invention is thus achieved by a lift drive for a rail-guided cantilever construction device, in particular for use in bridge construction, wherein the cantilever construction device comprises a main frame which is guided by at least one rail for receiving at least one formwork, with a lift device, wherein a first end of the lift device is designed to be connected to the main frame, and a second lift device end opposite the first end can be moved relative to the main frame when the first end of the lift device is connected to the main frame, with a first fixing device which is connected to the first end of the lift device and designed to fix the first end of the lift device with respect to the at least one rail, and with a second fixing device which is connected to the second end of the lift device and is designed to fix the second end of the lift device with respect to the at least one rail, wherein the first and second fixing devices can each be releasably fixed with respect to the at least one rail in a reversable manner.

The first end of the lift device is designed to be connected to the main frame directly or indirectly, for example, via the first fixing apparatus. When the main frame is connected to the first fixing device and the first fixing device is connected to the first end of the lift device, the first end of the lift device is designed to be indirectly connected to the main frame or to be indirectly attached to the main frame. The first fixing device can be connected directly to the first end of the lift device or to the main frame, provided said main frame is connected to the first end of the lift device. Further or other components may also be present between the first fixing device and the first end of the lift device as long as the first fixing device is connected to the first end of the lift device in such a way that it can fix the first end of the lift device, and thus the cantilever construction device, with respect to the at least one rail. Instead of fixing/attaching the first fixing apparatus to the at least one rail, the rail can also be connected to a fixing rail via one or more connecting components, said fixing rail preferably running parallel to the at least one rail, wherein the first fixing device is connected via one or more coupling elements to the first end of the lift device and can be fixed relative to the fixing rail. In particular, the fixing rail allows for the lift drive, according to the invention, to be retrofitted to a conventional lift drive with a locking head. Correspondingly, one or more components can be present between the second fixing device and the second end of the lift device as long as the second fixing device is connected to the second end of the lift device in such a way that said fixing device can fix the second end of the lift device, and thus the cantilever construction device, with respect to the at least one rail. Instead of fixing the second fixing apparatus on the rail, the second fixing device can be fixed on the fixing rail connected to the at least one rail by means of one or more connecting components, which can be connected to the second end of the lift device via one or more coupling elements. The connection of the first and second fixing devices to the ends of the lift device can be releasable in a reversible manner, e.g., as a screw connection, or releasable in an irreversible manner, e.g., as a welded connection. If the cantilever construction device is only fixed with respect to the rail via one of the fixing devices, the lift device is designed to hold the cantilever construction device. The first end can be an end of a cylinder of the lift device or an end of a piston of the lift device. In addition to bridge construction, the lift drive can also be used in tunnel construction or in climbing construction.

Because the lift device can be fixed/attached by the first fixing device and/or the second fixing device with respect to the at least one rail, it is possible to safely move the cantilever construction device when the cantilever construction device is connected to the first end of the lift device without the cantilever construction device being able to start moving independently, for example, due to an inclination of the bridge to be built, in or against the direction of travel. In particular, when there are high longitudinal bridge inclinations, i.e., bridge inclinations greater than 2°, which corresponds to 3.5%, an uncontrolled movement of a cantilever construction device with roller or antifriction bearings can be avoided and/or slowed by one or both of the first and second fixing devices. The first and second fixing devices therefore form a braking system for the secure movement of the cantilever construction device. The braking system prevents an uncontrolled movement, for example, a sliding or slipping, of the cantilever construction device. It is not necessary to intervene in the bearing of the cantilever construction device. Since only two fixing devices, which fix the lift device with respect to the rail, have to be attached to the lift device, the lift drive has a simple and compact design.

Since, according to the invention, there is a fixing device for fixing/attaching the main frame of the cantilevering device with respect to the rail at each end of the lift device, the lift device can be attached at the second end with respect to the rail when the main frame connected to the first end is moved due to an extension or retraction of the lift device. The main frame can then be attached with respect to the rail via the first fixing device, and the second fixing device can be detached from the rail in order to allow for the lift device to be retracted or extended without moving the main frame. The lift device can then be used again to move the main frame. During the movement, the main frame is therefore always attached to the rail by one of the two fixing devices so that the cantilever construction device can be safely moved without the cantilever construction being able to move in an uncontrolled manner. The first and second fixing devices acting as a braking system do not intervene in the bearing of the cantilever construction device but are each connected to one of the two ends of the lift device. Therefore, the cantilever construction device can be safely moved regardless of its mounting, even if the bridge has a high longitudinal inclination greater than 2°, which corresponds to 3.5%. This applies to both forward and reverse travel for which the lift drive or the cantilever construction device does not need to be converted. Instead of having to apply a wedge in front of the rollers of a roller bearing of the cantilever construction device, the fixing devices can be controlled hydraulically, for example.

Instead of achieving a self-locking of the movement of the cantilever construction device by friction, as in the prior art, the controlled movement of the cantilever construction device is ensured, according to the invention, by attaching each of the two fixing devices with respect to the rail by means of a positive or non-positive connection. There is therefore no need to use a slide bearing, which is why a safe movement on rollers or cylinders is possible, since friction-influencing agents such as ice, oil, dirt, or water do not affect the braking process of the cantilever construction device. Instead, the movement of the cantilever construction device can take place with minimized friction via rollers/cylinders and can be easily controlled via a lifting movement of the lift device. If the slide bearing is omitted, wear parts, for example, components such as siding plates that slide on each other, are no longer necessary. Due to the minimized friction, the efficiency of the assembly consisting of the lift drive and the cantilever construction device can be increased due to the lower friction. Even the friction of a roller or an antifriction bearing can be reduced since an uncontrolled movement of the cantilever construction device can be avoided solely by the lift drive with two fixing devices, according to the invention. As the bearing friction decreases, the efficiency loss of the assembly consisting of the lift drive and cantilever construction device increases since less energy has to be used to move the cantilever construction device.

With ever higher safety requirements in the future, a positive fixation of the first and/or the second fixing device(s) with respect to the rail, e.g., by means of a wedge which engages in a recess or indentation in the rail, offers increased safety compared to a non-positive fixation, for example by clamping the respective fixing device on the rail or a fixing rail connected to the rail. Finally, an operator does not have to be in the immediate danger area of the main frame, the bearing of the cantilever construction device and/or the lift device. This applies not only to an operation of the fixating devices by means of a hydraulic, pneumatic or electrical control unit but also for a manual operation since the operator can operate a toggle lever as part of the respective fixing device in such a way that he does not have to reach into a space above the rail.

In a preferred embodiment of the invention, the lift device is fixed with respect to the at least one rail in such a way that, when the first end of the lift device is lifted in one direction relative to the at least one rail, the main frame is displaced relative to the at least one rail, the second fixing device is fixed with respect to the at least one rail, and that, during a lifting movement of the second end of the lift device in one direction relative to the at least one rail, the first fixing device is fixed with respect to the at least one rail. This way, a given lift of the lift device can be used effectively to move the main frame and thus the cantilever construction device. For example, the lift device is extended in order to move the main frame relative to the rail and, with the main frame resting relative to the rail, is retracted in order to carry out the next lift. The lift device and the fixing devices thus form a caterpillar to which the main frame is connected, and which is designed to perform a caterpillar movement relative to the rail, in particular, in order to move the main frame relative to the rail.

The main frame can be guided by the at least one rail via a roller or antifriction bearing with the first and second fixing devices, according to the invention, being designed in a corresponding or identical form. Corresponding designs of the two fixing devices allow for a cost-effective and simplified structure of the fixing devices compared to different designs. Roller and antifriction bearings offer a lower coefficient of friction than slide bearings. In particular, identical designs of the fixing devices allow a series or mass production and are also advantageous for safety reasons since only one fixing device has to be certified.

The first and the second fixing devices can each be fixable with respect to the at least one rail by means of a positive and/or non-positive fit and can, in particular, be fastened to the rail and/or at least one fixing rail connected to the rail. A slide bearing can then be dispensed with and a safe and friction-minimized movement on rollers or cylinders is possible.

At least one of the fixing devices advantageously comprises at least one fixing layer or one fixing element, for example, a brake lining, to be applied to the at least one rail or the at least one fixing rail that is connected to the rail in the fixed state. An unlocking lift device, e.g., a pneumatic or hydraulic lift device is configured to interact with the fixing layer or the fixing element and an elastic means, for example, one or more disk or leaf springs, in such a way that the fixing layer or the fixing element rests against the at least one rail or the at least one fixing rail connected to the rail due to the elastic means in order to fix the fixing device when the unlocking lift device is retracted and/or is out of order. This way, a simply constructed, reliable and inexpensive to manufacture self-locking fixing device is provided, which is fixed without an actuation and thus increases the safety on the construction site.

At least one of the fixing devices preferably comprises at least one latching/snap-in element, for example, in the form of a pawl or foldable latching lug, wherein the at least one rail or fixing rail comprises recesses and/or depressions in its longitudinal direction, into which the at least one latching/snap-in element can engage in order to fix the fixing device with respect to the at least one rail. This results in fixing devices of a simple and reliable design which are configured to interact with the rail or the fixing rail in order to fix said devices thereon. Alternatively, each fixing device can comprise a bracket which is designed to engage under a collar which is present in the longitudinal direction on one side of the rail or the fixing rail. The end of the bracket engaging under the collar is designed to be able to be non-positively connected to the collar, e.g., via a clamp connection. The clamp connection can be established via a clamp or a screw inserted into a thread at the end of the curve.

In a preferred embodiment, a displacement of the lift device is selected to be greater than or equal to a distance from the recesses and/or depressions located next to one another in the longitudinal direction of the at least one rail or fixing rail so that, when the fixing device is fixed with respect to the at least one rail, the displacement length is sufficient to move the main frame by the distance between the recesses and/or depressions located next to one another. The recesses and/or depressions particularly preferably have the same spacings over a length of the at least one rail or fixing rail or a part thereof. The distance between adjacent recesses and/or depressions is then selected so that each of the recesses and/or depressions of the fixing devices can be used to fix or "support" the lift device on the rail.

The fixing device preferably comprises at least one manual, hydraulic, pneumatic or electromotive lift device for executing a linear translational movement, which is designed to ensure a reversible engagement of the at least one latching/snap-in element in the recess or the depression of the at least one rail or fixing rail. This lift device can be used to raise or lower a pawl, i.e., to detach the pawl from and attach the pawl to the rail or the fixing rail. An electric lift device allows for a more flexible control compared to a hydraulic lift device but requires power on the construction site, which is why hydraulic and pneumatic lift devices are often preferred over electric lift devices. It is advantageous that a hydraulic/pneumatic lift device can be exchanged for an electrical lift device or supplemented by an electrical lift device.

The cantilever construction device is advantageously guided by two or four rails arranged parallel to one another, wherein the first and second fixing devices each comprise one pawl per rail, so that a total of two pawls of the first and second fixing devices are assigned to each rail, and the lift drive of the cantilever construction device as a whole either comprises two rails and four pawls or four rails and eight pawls. Compared to lift drives with fewer pawls, the maximum permissible load of the cantilever construction device is increased in this embodiment of the lift drive. Such a lift drive can, in particular, move and brake cantilever construction devices such as those used in bridge construction. The pawls of the respective first and/or second fixing devices of both rails, which are opposite one another in a direction perpendicular to the longitudinal direction of each rail, can be connected to one another via a web which is designed to move the pawls in concert.

The manual lift device advantageously comprises rotatable toggle levers, for example, in the form of a rod, shaft or a bar, one lever arm end of which is rotatably coupled to the web approximately centrally between the pawls that are opposite each other and perpendicular to the longitudinal direction of each rail, said lever arm end being formed to move the pawls of the first fixing devices of the two rails and/or of the second fixing devices of the two rails that are connected via the web in concert with each other. The toggle level acting on both pawls allows for a simple design of the manual fixing device and a simultaneous lifting and/or lowering of the pawls. This way, the respective fixing device can be operated manually in a quick and effective manner. The toggle lever can be coupled to the web via a clamp that can be moved along the web. When the toggle lever is not in use, the clamp can be moved to one end of the web in order to align the end of the toggle lever facing away from the web parallel or substantially parallel to the web. This way, installation space can be saved.

It is advantageous if at least one hydraulic, pneumatic or electromotive lift device, preferably two of these lift devices, is/are coupled to the web so as to move the pawls of the first fixing devices of both rails and/or the second fixing devices of both rails connected to one another via the web in concert. This results in a simple and automatically controllable lift drive which is designed to move the pawls in concert.

The lift drive can comprise a controller which is set up so that the hydraulic or pneumatic lift device with an existing hydraulic or pneumatic assembly can be controlled, for example, in order to move the main frame by means of the lift device or to move an upper and/or lower support arrangement attached to the main frame relative to the main frame, or a hydraulic or pneumatic assembly that is separate from the existing hydraulic or pneumatic assembly. The use of an existing assembly reduces the number of components to be purchased and stored, which is particularly advantageous on the construction site because of the limited storage space. The control unit allows for an automated or fully automatic operation of the first fixing device and/or the second fixing device.

The control unit is preferably set up in such a way that each latching/snap-in element can be individually controlled or a plurality of latching/snap-in elements, for example, all latching/snap-in elements of the first or second fixing devices, can be jointly controlled via a hydraulic or pneumatic assembly. This results in a simple and reliable lift drive.

The control unit can be set up in such a way that the latching/snap-in elements can be released from the rail or the fixing rail by means of the one or more hydraulic, pneumatic or electromotive lift device(s), and the latching/snap-in elements can be released independently by gravity and/or another force, e.g., a spring force of a spring or some other elastic means, thereby avoiding the control of the one or more hydraulic, pneumatic or electromotive lift device(s) into which the recesses and/or depressions of the at least one rail or fixing rail can engage. Since the latching/snap-in elements only have to be lifted, the amount of energy required to operate the lift drive is reduced compared to a lift drive in which the latching/snap-in elements have to be controlled in order to be lowered.

The lift device is advantageously designed as a hydraulic cylinder, spindle drive or rack and pinion drive with the spindle or rack and pinion drive being driven, for example, by an electric motor, actuator or linear drive. These types of lift devices are reliable and can be obtained with different displacement lengths and lifting capacities.

The invention also covers a rail-guided cantilever construction device that includes the lift drive, according to the invention.

A method for moving a rail-guided cantilever construction device, in particular for use in bridge construction, with the lift drive according to the invention, is part of the invention as well. The method comprises the following steps:

- Fixing the second fixing device with respect to the at least one rail when the lift device is at least partially retracted or at least partially extended,
- Executing the lifting movement of the first end of the lift device in one direction relative to the at least one rail either as a movement of the first end of the lift device toward the second end of the lift device or as a movement of the first end of the lift device away from the second end of the lift device, wherein the main frame attached to the first end of the lift device in the one direction is moved relative to the at least one rail in its longitudinal direction,
- Fixing the first fixing device with respect to the at least one rail after the completion of the lifting movement of the lift device in one direction and releasing the second fixing device from the rail,
- Executing the lifting movement of the lift device of the second end of the lift device in the one direction relative to the at least one rail, wherein the main frame is fixed by the first fixing device with respect to the at least one rail and the second fixing device is displaced in the one direction relative to the at least one rail in its longitudinal direction.

The one direction can be defined as the forward or backward direction of the main frame. The first end of the lift device can be an end of a lifting cylinder or an end of a piston of the lift device. The lift device, i.e. the lifting piston opposite the lifting cylinder, can be extended in order to displace the main frame relative to the at least one rail and be retracted with the main frame being in rest relative to the rail in order to carry out the next lift. Alternatively, the lift device, i.e. the lifting piston opposite the lifting cylinder, is retracted in order to move the main frame relative to the rail and extended with the main frame being in rest relative to the rail in order to carry out the next lift. The lift device and the fixing devices thus form a caterpillar to which the main frame is connected, and which executes a caterpillar movement relative to the rail and thereby moves the main frame relative to the rail. The method allows for a structure that is unchanged over the retraction and extension movement of both fixing devices. The lift device does not have to be separated from the main frame and reconnected to the main frame. Instead, the assembly of the lift device and the fixing devices can be used in an unchanged form for both forward and reverse travel. This simplifies the operation of the lift drive and increases work safety.

If the second fixing device is only released with respect to the at least one rail (4*a*, 4*b*, 4'*a*, 4'*b*), in particular from the at least one rail or from a fixing rail connected to the rail when the first fixing device is released with respect to the at least one rail after the completion of the lifting movement of the lift device in the one direction, the main frame is fixed by both fixing devices with respect to the at least one rail when it is at rest relative to the rail. This increases the safety of the fixation compared to a fixation of the main frame with respect to the rail by only one of the fixing devices. An uncontrolled movement of the main frame, e.g., in the event of a separation of the piston from the cylinder of the lift device when fixed only by the second fixing device, is effectively avoided in this way.

The execution of the lifting movement of the lift device in the one and the other direction is advantageously carried out either partially or completely and to the same extent in terms of the displacement length. If the same, in particular, complete, displacement length is used in both directions of the lifting movement, i.e., when the lift device is retracted and extended, a predetermined displacement to be carried out can be carried out with a minimized number of fastening and releasing operations of the first and second fixing devices. This minimizes the work and energy required for the operation of the lift drive.

The method steps according to the invention are preferably defined as a cycle and the cycle is run through until the main frame has been moved by a predetermined displacement in one direction relative to the at least one rail, for example, a length of a concreting section to be concreted with the cantilever construction device.

The fixing devices advantageously each comprise at least one manual, hydraulic, pneumatic or electromotive lift device for executing a linear translational movement, which is designed to releasably fix the fixing devices with respect to the at least one rail in a reversible manner and to release said devices with respect to the at least one rail, and the fixing of the respective fixing device with respect to the at least one rail takes place independently by using gravity and/or by another force, e.g., a spring force of a spring or some other elastic means, i.e., avoiding an actuation and/or control of the respective manual, hydraulic, pneumatic or electromotive lift device by engaging at least one latching/snap-in element in a recess or a depression of the at least one rail or the fixing rail connected to the rail. Since the latching/snap-in elements only have to be lifted, the energy required to operate the lift drive decreases compared to a solution in which the latching/snap-in elements are manually lowered or have to be actuated in order to be lowered. The fixing devices are actuated semi-automatically if the latching/snap-in elements are lifted manually without a manual lowering of the latching/snap-in elements. The fixing devices are actuated in a fully automatic manner if the latching/snap-in elements are lifted by means of an actuation without a lowering of the latching/snap-in elements by means of an actuation.

Further features and advantages of the invention are provided in the following detailed description of an exemplary embodiment of the invention, the claims and the figures of the drawing. The features shown in the drawing are depicted in such a way that the special features, according to the invention, can be illustrated in great detail. The various features can each be implemented individually or collectively in any combination in variants of the invention. In the figures, the same reference symbols denote the same or corresponding elements.

BRIEF DESCRIPTION OF THE DRAWINGS

In these.

DETAILED DESCRIPTION

Figure 1:
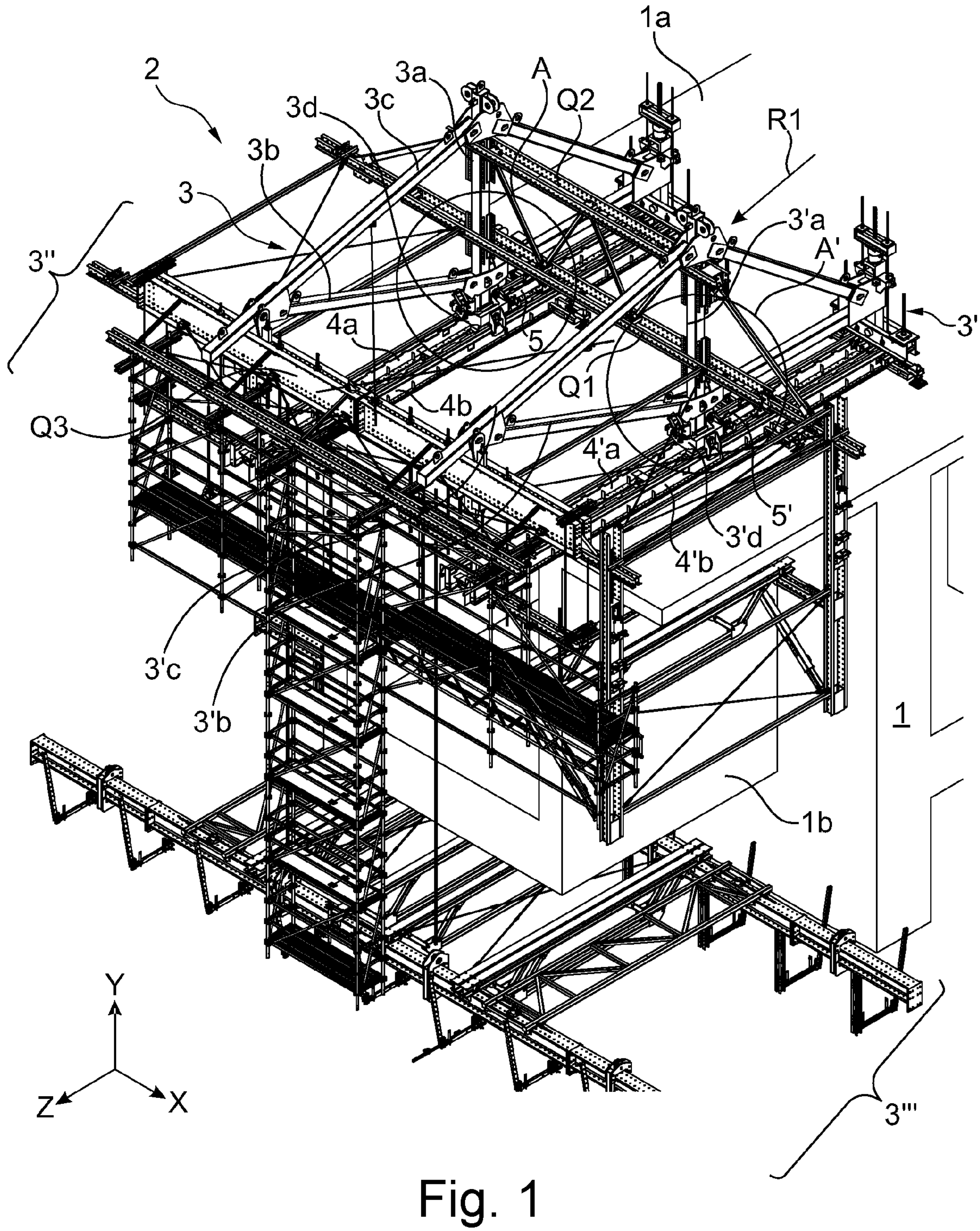
FIG. 1 is a cantilever construction device for use in bridge construction with a main frame guided by four rails, said frame being attached to a lift drive according to the invention.

FIG. 1 is a cantilever construction device 2 which is used to concrete a portion to be concreted at the end of an outer portion of a bridge 1. The cantilever construction device 2 comprises a base frame with two main frames 3, 3'. For concreting the next portion of the bridge, the cantilever construction device 2 can be moved in the direction R1 in the Z direction. The main frame 3 comprises a plurality of struts 3a-3c, which are connected to one another. At the end of the strut 3a facing the bridge 1, the main frame 3 comprises a frame base 3d, which rests on two mutually parallel rails 4a, 4b, which are each attached to a surface 1a of the bridge via a roller bearing (not shown). The main frame 3 is connected to the further main frame 3' via cross struts Q1-Q3 and comprises struts 3'a-3'c which are connected to one another. The further main frame 3' is guided over a further frame base 3'd by means of two rails 4'a, 4'b, which are aligned parallel to one another, so that the main frames 3, 3' can be moved together in the forward direction (Z direction) and/or in the reverse direction (negative Z-direction). For this purpose, the main frame 3' with a further frame base 3'd rests on rails 4'a, 4'b. The rails 4a, 4b, 4'a, 4'b lie parallel to one another on the surface 1a and are connected to said surface so that the rails cannot lift off in the Y direction. The frame bases 3d, 3'd comprise brackets, which engage under the rails 4a-4'b and are secured against lifting off in the Y direction.

To brace the bridge 1, a hollow box 1b is provided below the surface 1a in the negative Y direction as part of the bridge 1. In addition to the main frames 3, 3', the cantilever construction device 2 comprises an upper support arrangement 3" and a lower support arrangement 3'''. A formwork (not shown in FIG. 1) is attached to each of the support arrangements 3", 3''' for concreting the next bridge portion.

The frame bases 5, 5' are each attached to lift devices 5, 5' which adjoin the frame base 5, 5' in the negative Z direction. The detail A shows the region of the lift device 5, and the detail A' shows the region of the lift device 5'. The main frames 3, 3' are each connected to the lift drive, according to the invention, wherein the lift drive comprises the lift device 5 for driving the main frame 3, and the lift comprises the lift device 5' for driving the main frame 3'.

Figure 2B:
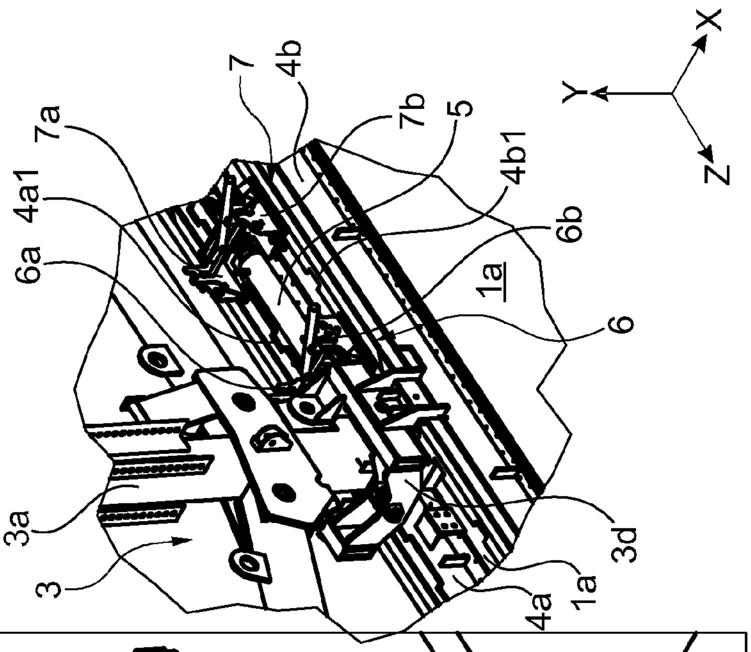
FIG. 2a, b is a detail of FIG. 1, showing the lift drive according to the invention with a lift device and fixing devices (a) and an enlarged detail thereof (b), each in a three-dimensional external view in a first embodiment.
Figure 2A:
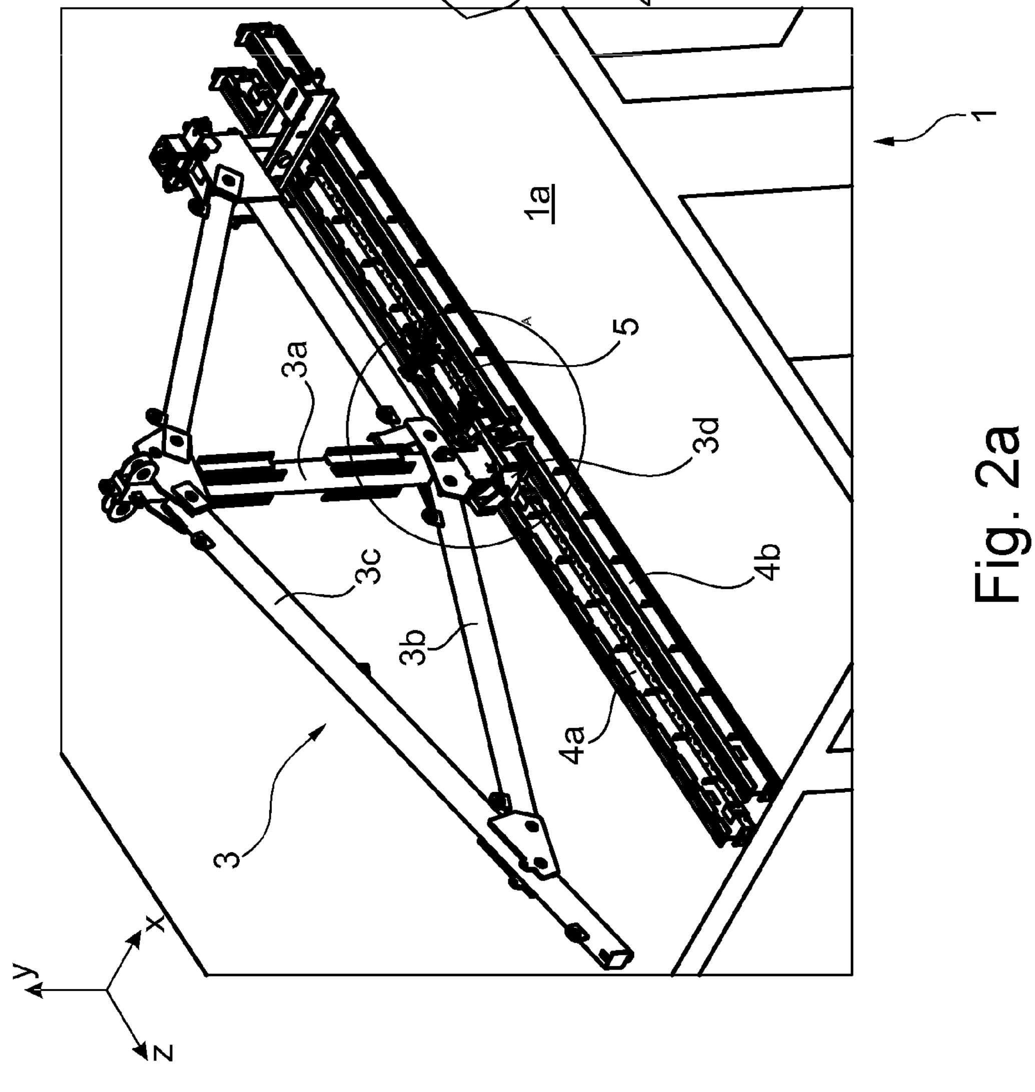

FIG. 2a shows a detail from FIG. 1 with the main frame 3 and the lift device 5, wherein the lift device 5 is attached to the frame base 3d of the main frame 3 in the Z direction. At an end of the frame base 3d that is not attached to the lift device 5, the frame base is connected to the struts 3a, 3b, which, in turn, are connected to one another via the strut 3c. In the negative Z direction, further struts adjoin the strut 3a, said further struts being connected to one another to form a further frame base which can be attached to the rails 4_a_, 4_b_, and is designed to form a counterweight to the upper support arrangement 3" and the lower support arrangement 3". The rails 4_a_, 4_b_ extend in the Z direction and are aligned in parallel to one another in such a way that the frame base 3_d_ can roll on both rails 4_a_, 4_b_ to allow for a forward travel in the Z direction or a reverse travel in the negative Z direction. A support of the frame base 3_d_ via a slide bearing on the rails 4, 4_b_ or on just one of these rails is also possible.

In FIG. 2_b_, an enlarged detail of FIG. 2_a_ is shown in a spatial external view, wherein the lift drive according to the invention comprises, in addition to the lift device 5, a first fixing device 6 with first fixing components 6_a_, 6_b_ and a second fixing device 7 with second fixing components 7_a_, 7_b_ on opposite first and second ends of the lift device 5. The two first fixing components 6_a_, 6_b_ are both connected to the first end of the lift device 5 to which the frame base 3_d_ is attached. The first fixing component 6_a_ is designed to fix the first end of the lift device 5 on the rail 4_a_, and the further first fixing component 6_b_ is designed to fix the first end of the lift device 5 on the rail 4_b_. One fixing component 6_a_ or 6_b_ each would be sufficient for the first fixing device 6, but the main frame 3 is more securely fixed to the rails 4_a_, 4_b_ via the frame base 3_d_ if both first fixing components 6_a_, 6_b_ are fixed together on the rails.

At the second end of the lift device 5, which is opposite the first end of the lift device 5 to which the frame base 3_d_ is attached, a second fixing device 7 with second fixing components 7_a_, 7_b_ is connected to the lift device 5. The second fixing components 7_a_, 7_b_ are each connected to the second end of the lift device. The second fixing components 7_a_ are designed to fix the second end of the lift device to the rail 4_a_, and the second fixing components 7_b_ are designed to fix the second end of the lift device to the rail 4_b_. One fixing component 7_a_ or 7_b_ each would be sufficient for the second fixing device 7, but the main frame 3 is more securely fixed to the rails 4_a_, 4_b_ via the frame base 3_d_, the lift device 5 and the second fixing device 7 if both second fixing components 7_a_, 7_b_ are fixed together on the rails.

The frame base 3_d_ is attached in the Z direction to the first end of the lift device 5 to which the first fixing device 6 is connected in such a way that the frame base is attached to the first end of the lift device 5 via the first fixing components 6_a_, 6_b_ of the first fixing device 6. The frame base 3_d_ does not have to be attached in the Z direction to the lift drive with the lift device 5 and the first fixing device 6 and the second fixing device 7, according to the invention, but the frame base 3_d_ and thus the cantilever construction device can also be attached to the first end of the lift device 5 in the negative Z direction. The frame 3 can also be arranged between the first end of the lift device 5 and the first fixing device 6 via the frame base 3_d_ as long as the main frame 3 is attached to the first end of the lift device 5, and the first fixing device is thus connected to the first end of the lift device 5 in such a way that the first fixing device can fix the first end of the lift device 5 to at least one of the rails 4_a_ or 4_b_.

Although the main frame 3 rests on the surface 1_a_ of the bridge 1 via the two rails 4_a_, 4_b_, it is also possible for the main frame 3 to rest on only one of the two rails 4_a_, 4_b_. In this case, only a first fixing component 6_a_ or 6_b_ is connected as a first fixing device 6 to the first end of the lift device 5, and only one of the second fixing components 7_a_ or 7_b_ is connected to the lift device 5 as a second fixing device 7 at the second end of the lift device 5. Two rails 4_a_, 4_b_ allow for a higher load capacity than just one rail 4_a_ or 4_b_. A comparison of the lift drives, according to the invention, as shown in the details A, A' in FIG. 1 with the lift devices 5, 5' and the main frames 3, 3' attached to lift devices via the frame bases 3_d_, 3'_d_, shows that the explanations in FIG. 2_a_, 2_b_ relating to the lift drive with the lift device 5 according to the invention and relating to the main frame 3 with the frame base 3_d_ apply correspondingly to the lift drive with the lift device 5' and to the main frame 3' with the frame base 3'_d_, according to the invention, as shown in detail A' of FIG. 1.

FIG. 3_a_ shows the first fixing device 6 with the first fixing component 6_a_ at the first end of the lift device 5 with which the main frame 3 is connectable and connected in a lateral cross-sectional view in the unlocked state relative to the rail 4_b_ as a positively fixing device. The fixing components 6_a_, 6_b_ have a corresponding structure and identical parts, which lowers the costs of producing the lift drive, according to the invention, but is not essential to the invention. The first fixing component 6_b_ comprises a base plate 6_b_1 on which a first guide plate 6_b_3 is attached in the Y direction. In the negative Z direction, a holding plate 6_b_2 is attached to the base plate 6_b_ 1 such that the holding plate 6_b_1 can engage below the rail 4_b_ in the negative Y direction. The holding plate 6_b_2 is designed so that the first fixing component 6_b_ and thus the first fixing device 6 are not lifted off the rail 4_b_ in the Y direction. In order to ensure a forward or backward movement of the fixing component 6_b_, a distance between the holding plate 6_b_1 and the base plate 6_b_3 is selected to be greater than the height of the rail 4_b_.

The first guide plate 6_b_3 comprises an elongated hole in the Y direction, as shown in FIG. 3_b_, in which a web 8 is guided, wherein a latching/snap-in element is attached to the end of the web 8 at one end of the web 8 in the X direction (out of the plane of the sheet) in the form of a pawl 6_b_5. The pawl 6_b_5 is guided next to the elongated hole by a recess 6_b_" in the base plate 6_b_1 such that a width 6_b_' of the blade 6_b_5 is selected to be equal to or smaller than a width 6_b_" of a recess in the base plate 6_b_1. In FIG. 3_a_, the pawl 6_b_5 is in a position facing away from the rail 4_b_ at the end, in particular, at the stop of the elongated hole in the Y direction, such that the fixing component 6_b_ is unlocked relative to the rail 4_b_. In relation to the rail 4_b_ and/or the guide plate 6_b_3, the pawl 6_b_5 is therefore in an unlocking position PE. A width 6_b_''' of a recess in the holding plate 6_b_2 is greater than the width 6_b_' of the pawl 6_b_5 such that when the pawl 6_b_5 is moved in the negative Y direction, the end of the pawl 6_b_5 facing the rail 4_b_ (in the negative Y direction) can pass through the recess in the holding plate 6_b_2 in addition to the recess in the base plate 6_b_1. In the unlocking position PE, the end of the pawl 6_b_5 facing the rail 4_b_ is located in a region of the rail 4_b_ facing away from the surface 1_a_ (above the rail 4_b_) such that the fixing component 6_b_ can be moved in the forward or backward direction of the main frame 3. The first fixing device 6 has a first connecting element 9 in the Z direction for fixing the first fixing device 6 to the frame base 3_d_ and thus to the main frame 3. The first fixing device 6 is connected in the negative Z direction to the lift device 5 in such a way that the first fixing device can fix the first end of the lift device 5 on the rail 4_b_ in the Z direction.

FIG. 3_b_ shows the first fixing component 6_b_ in a lateral cross-sectional view in the locked state relative to the rail 4_b_. The elongated hole present in the first guide plate 6_b_3 has a width which is equal to or less than a width of the web 8. The pawl 6_b_5 is in a position facing the rail 4_b_ at the end, in particular at the stop, of the elongated hole in the negative Y direction such that the fixing component 6_b_ and thus the lift device 5, which is connected to the first fixing component 6_b_ at its first end, is fixed. Therefore, the pawl 6_b_5 is in a locking position PV. In the locking position, the pawl **6*b*5 passes through a recess 4*b*1 made in the rail 4*b having a width 4*b*' which is equal to or greater than the width 6*b*' of the pawl 6*b*5. A distance PA between the unlocking position PE and the locking position PV is chosen such that the pawl 6*b*5 passes through the recess in the base plate 6*b*1 with the width 6*b*", the recess in the rail 4*b* with the width 4*b*' and at least part of the recess in the holding plate 6*b*2 with the width 6*b*'''. Since, in the locked position, the pawl 6*b*5 attached to the web 8 is guided through the elongated hole in the first guide plate 6*b*3 as well as the recess in the base plate 6*b*1 and the recess in the holding plate 6*b*2, a stable and reliable locking of the first fixing component 6*b* of the first fixing device 6 and thus the first end of the lift device 5 and the main frame 3 attached to it on the rail 4*b*** is achieved.

Figure 3B:
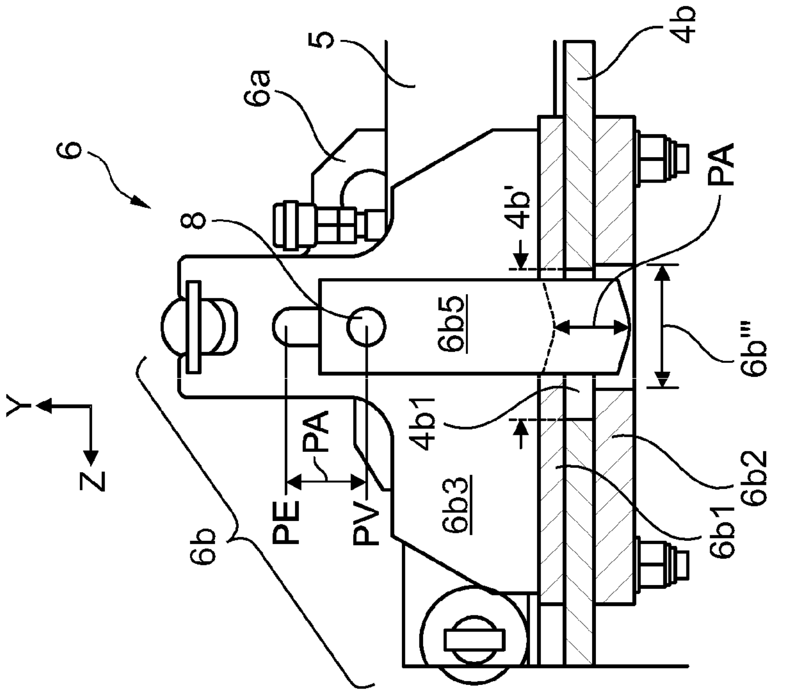
FIG. 3a, b is a fixing device with a positive fixation at one end of the lift device to which the main frame is attached in a lateral cross-sectional view in the unlocked (a) and the locked (b) state relative to the rail according to a first embodiment of the invention.
Figure 3A:
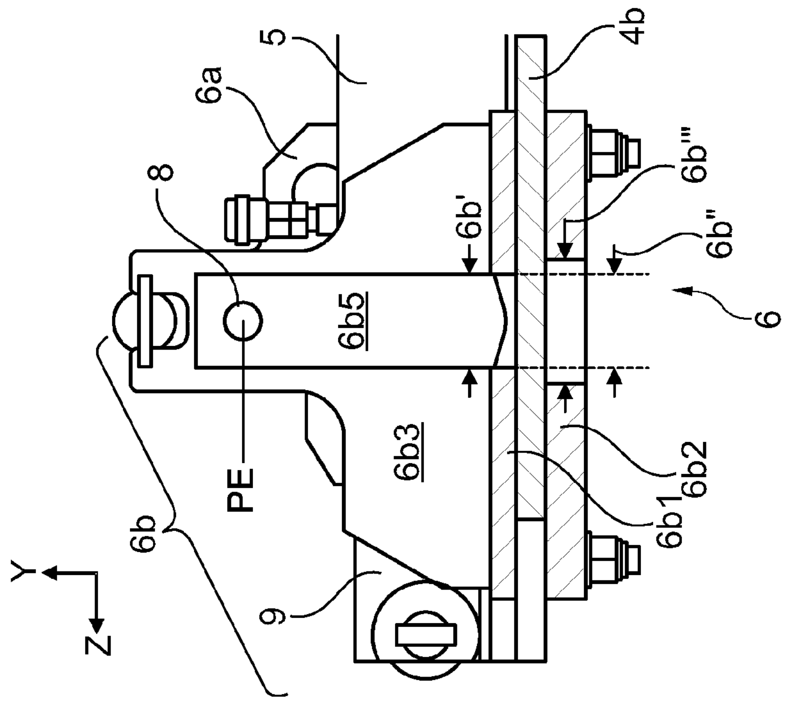
Figure 4B:
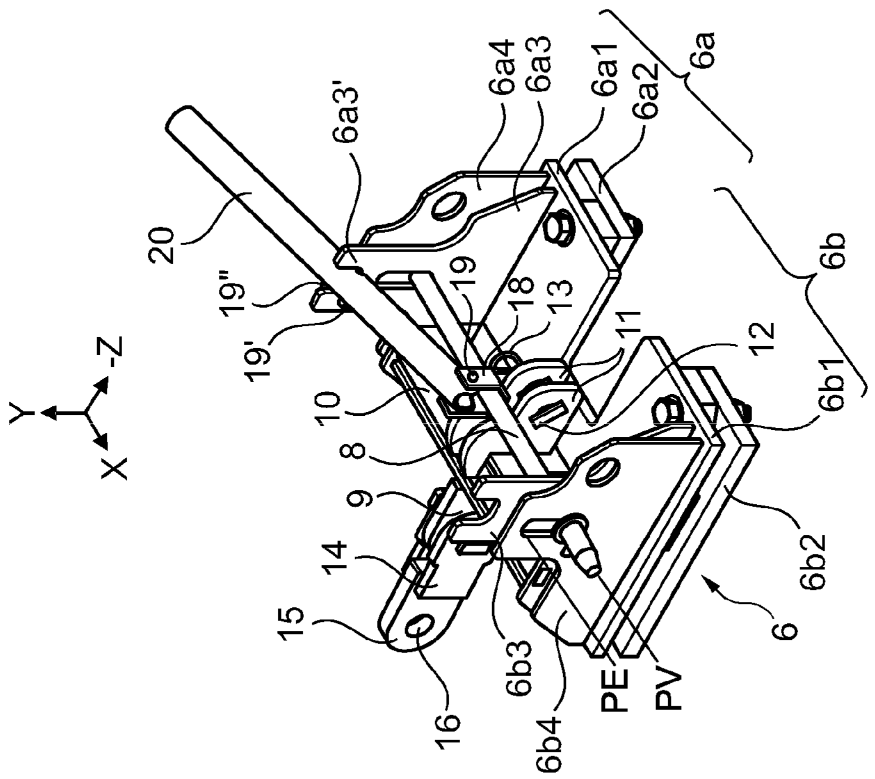
FIG. 4a, b is the fixing device shown in FIG. 3b as a combination of two fixing components with a shared manual lift device in the locked state in a front view (a) and in a spatial external view (b) according to a second embodiment of the invention.

FIG. **4*a* shows the first fixing device 6 shown in FIG. 3*a*, *b* with the first fixing component 6*b* and a further combined first fixing component 6*a* with a shared manual lift device in the locking position PV in a front view and, in FIG. 4*b*, in an enlarged spatial external view. The further first fixing component 6*b* is designed in accordance with the first fixing component 6*b* and comprises a base plate 6*a*1 with a holding plate 6*a*2 attached to said first fixing component in the direction facing the rail 4*a*, i.e., in the negative Y direction, and with a first guide plate 6*a*3 and a second guide plate 6*a*3' attached to said first fixing component in the direction facing away from the rail 4*a*, i.e., the Y direction. Between the first and second guide plates 6*a*3, 6*a*3', which are substantially parallel to one another, a pawl 6*a*5 is guided, which extends in the Y direction and, in terms of the geometrical dimensions of the pawl 6*b*5, substantially corresponds to the first fixing component 6*b*, which is guided between the first guide plate 6*b*3 and a second guide plate 6*b*4, which are guided substantially parallel to said first guide plate. Both first fixing components 6*a*, 6*b* are connected to one another via a first connecting plate 10. The base plates 6*a*1, 6*b*1** are designed as a common plate, which simplifies the design of both fixing components, but can also be present in different plates that can be connected to one another.

Both fixing components **6*a*, 6*b* share the web 8, at one end of which the pawl 6*b*5 is attached in the X direction and the pawl 6*a*5 is attached to the other end in the negative X direction. Approximately in the middle of the web 8, one end of a toggle lever 20 is rotatably coupled to the web via a clamp 18. The approximately central position 18' of the clamp 18 relative to the web 8 allows for a movement of the web 8 in a direction facing away from the rails 4*a*, *b*, i.e., in the Y direction, or a movement in a direction facing the rails 4*a*, *b*, i.e., in the negative Y direction, with approximately the same masses on both sides of the clamp 18. The clamp 18 comprises a recess 19 such that the end of the toggle lever 20 coupled to the web 8 can be rotatably connected to the clamp 18, for example, via a screw connection. The toggle lever 20 rests in a recess 6*a*3' of the first guide plate 6*a*3 and is connected to the toggle lever 20 via guide means 19', 19", which are on opposite sides of the first guide plate 6*a*3, which is guided relative to the first base plate 6*a*3 when the toggle lever 20 is guided by the recess 6*a*3'. The guide means 19', 19" can each be realized by a screw connection in which a screw is guided through a through hole in the toggle lever 20 in the Z direction and is secured by a nut. In this simple way, the toggle lever 20 is guided through the head of the screw and the nut opposite said head on the other side of the toggle lever when the toggle lever is arranged or offset in the recess 6*a*3'. The first guide plate 6*b*3 also has a recess at its end facing away from the rails 4*a*, 4*b*, i.e., in the Y direction, in such a way that the toggle lever 20 can be guided or offset not only in the recess 6*a*3' of the first fixing component 6*a* but also alternatively in the recess at the end of the first guide plate 6*b*3 of the first fixing component 6*b***.

The clamp 18 can be fastened to the web 8 or movably attached to it, as is the case with the first fixing device 6 in FIG. **4*a*, *b*. The clamp is arranged on the web such that it can be moved along the web 8, that is to say, in the X direction and in the negative X direction. This way, when the toggle lever 20 is lifted out of the recess 6*a*3' in a direction facing away from the rails 4*a*, 4*b*, i.e., in the Y direction, said lever can be aligned substantially parallel to the web 8 in a space-saving manner. If the clamp 18 is at a minimal distance from the first guide plate 6*a*3 or the further first guide plate 6*b*3 or rests against said guide plate, the space requirement of the toggle lever 20** is minimized, which serves to improve work safety.

Second connecting plates 11 are attached to first connecting plate 10 and are connected to one another via a bolt 12 with a locking pin 13 in order to be attached, for example, to the first end of the lift device 5. The first connecting element 9 for attaching, for example, the frame base **3*d* of the main frame 3 is also attached to the connecting plates 11 and thus to the first connecting plate 10 and thus to the first fixing components 6*a*, 6*b* and thus to the first fixing device 6. Third connecting plates 14 and a second connecting element 15 with a through hole 16 for attaching the frame base 3*d* are connected to the first connecting element 9**.

The structures of the first fixing components **6*a*, 6*b* are designed axially symmetrically in the Y/Z direction with respect to a plane formed centrally between the fixing components, which simplifies the common structure. Due to the shared use of the web 8 and the toggle lever 20 for moving toward and away from the rails 4*a*, 4*b*, i.e., the lifting and lowering of both pawls 6*a*5, 6*b*5, the common structure of the first fixing device 6 is additionally simplified. By locking the pawls in a direction facing the rails 4*a*, 4*b*, i.e., the negative Y direction, it is possible that a movement has to occur only in order to unlock the toggle lever 20 at the end that is opposite the end connected to the web 8 in the direction facing the rails 4*a*, 4*b*, i.e., the negative Y direction. As soon as the recesses 4*a*1 and 4*b*1 are present in the rails 4*a*, 4*b*, which are opposite one another in a direction perpendicular to the longitudinal direction of each of the rails 4*a*, 4*b*, i.e., in the X direction, as shown in FIG. 3*b* in such a way that the pawls 6*a*5, 6*b*5 can engage in these recesses, each of the pawls 6*a*5, 6*b*5 falls into the respective recess 4*a*1, 4*b*1 of each of the rails 4*a*, 4*b* due to the force of gravity. Alternatively, or in addition to gravity, another force, e.g., a spring force of a spring or some other elastic means, can be applied in such a way that each of the pawls 6*a*5, 6*b*5 falls into the respective recess 4*a*1, 4*b*1 of each of the rails 4*a*, 4*b*. This way, a semi-automatic manual operation of the first fixing device 6 can take place in a particularly advantageous embodiment of the lift drive, according to the invention. By means of the web 8 and the toggle lever 20, the first fixing component 6*b* can be releasably attached to the rail 4*a* in a reversible manner, and the further first fixing component 6*a* can be releasably attached to the rail 4*b* in a reversible manner. In the unlocking position PE, the first fixing component 6*a* is released from the rail 4*a* and, at the same time, the further first fixing component 6*b* is released from the rail 4*b* in this position. In the locking position PV, the fixing component 6*a* is attached to the rail 4*a* and the fixing component 6*b* is attached to the rail 4*b*. The first fixing component 6*a* and the further first fixing component 6*b* can be locked and unlocked together with the web 8 and the toggle lever 20, according to a particularly advantageous embodiment of the first fixing device, and thus according to the lift drive according to the invention. It is advantageous if the second fixing device 7 with the second fixing components 7***a*, 7*b* has a structure that corresponds to or is the same as that of the first fixing device 6. This simplifies the overall structure of the lift drive, according to the invention, and ensures a high reliability of the lift drive. It is also possible that the first and second fixing devices 6, 7 each comprise only one pawl which can engage in one of the rails 4*a*, 4*b* or in both rails 4*a*, 4*b*. The first fixing device 6 and/or the second fixing device 7 can also comprise more than two pawls which can be actuated individually, partially together or completely together.

Figure 4A:
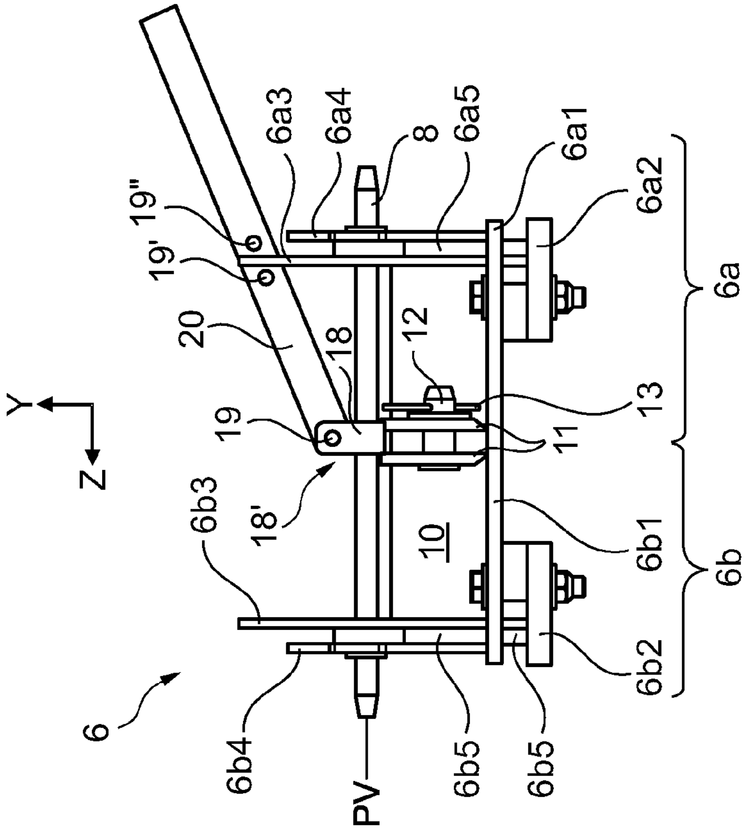
Figure 5B:
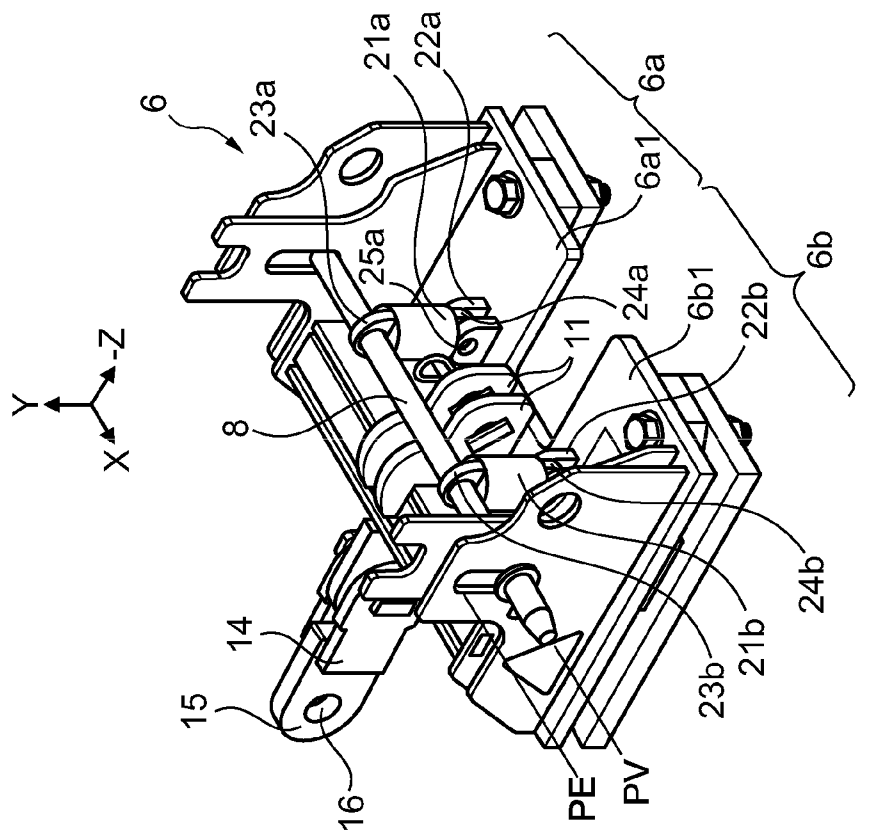
FIG. 5a, b is the fixing device shown in FIG. 3b as a combination of two fixing components with a shared hydraulic lift device in the locked state in a front view (a) and in a spatial external view (b) according to a third embodiment of the invention.
Figure 5A:
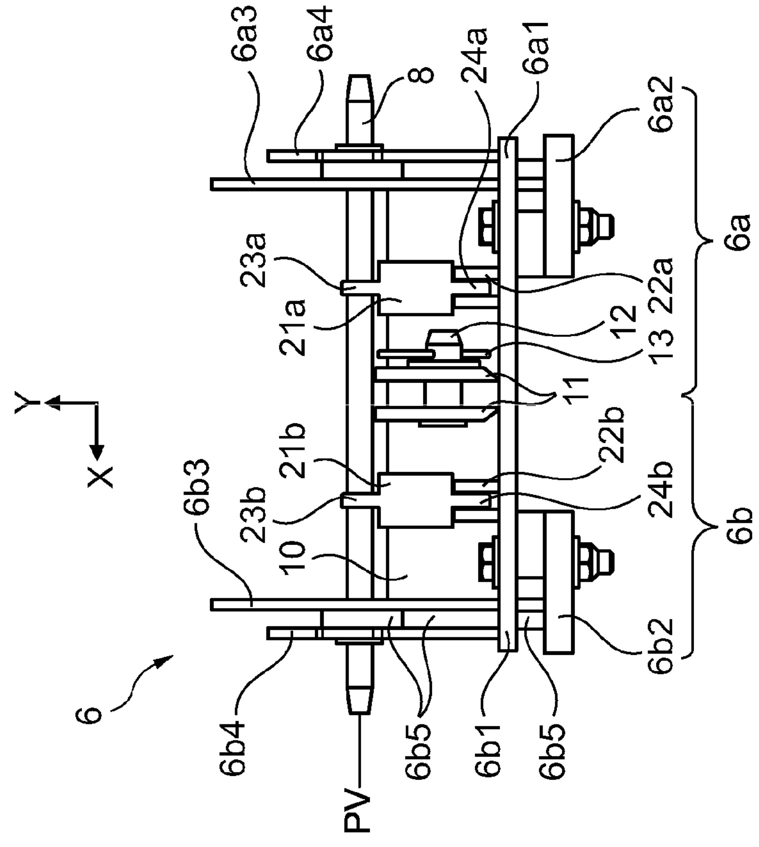

The first fixing device 6 shown in FIG. 3*b* is shown as a combination of the two fixing components 6*a*, 6*b* with a common hydraulic lift device in the locked state in the locking position PV in FIG. 5*a* in a front view and in FIG. 5*b* in a spatial external view. Because of the large number of identical parts/components, only the parts/components that are different or additional to the first fixing device 6 shown in FIG. 4*a*, 4*b* are discussed. The first fixing component 6*a* of the first fixing device 6 is assigned a first hydraulic lift device 21*a*-24*a*, which is arranged between the web 8 and the base plate 6*a*1. A lifting cylinder 21*a* with the retracted piston (not shown) is connected to the base plate 6*a*1 via a first flange 24*a*, which engages in a mount 22*a* of the base plate 6*a*1, and the piston is connected to the web 8 via a second flange 23*a*. FIG. 5*b* shows a through hole 25*a* in the mount 22*a*, which is designed to transition into a corresponding through hole in the first flange 24*a* in order to attach the lifting cylinder 21*a* to the base plate 6*a*1, for example, by means of a screw connection. The lifting cylinder 21*a* is designed to extend the piston in a direction facing away from the rail 4*a*, i.e., in the Y direction, and to retract said piston in a direction facing the rail 4*a*, i.e., in the negative Y direction. In the extended state of the lift device, the first fixing component 6*a* is in the unlocking position PE, and in the retracted state of the lift device, the first fixing component 6*a* is in the locking position PV.

The further first fixing component 6*b* of the fixing device 6 comprises a further lift device 21*b*-24*b*, wherein the further lifting cylinder 21*b* is designed with the piston retracted (not shown) corresponding to the lifting cylinder 21*a*. Attached to the base plate 6*b*1 is a further mount 22*b* in which a further first flange 24*b* of the lifting cylinder 21*b* is connected to the base plate 6*b*1. At the end of the piston facing away from the rail 4*b*, there is a further second flange 23*b* via which the further lifting cylinder 21*b* is connected to the web 8. The further lifting cylinder 21*b* is designed to extend the piston in the direction facing away from the rail 4*b*, i.e., in the Y direction, and to unlock the fixing device 6 and to retract the web 8 in the direction facing the rail 4*b*, i.e., in the negative Y direction, into the piston in order to lock the fixing device 6. The design of the lift devices 21*a*-24*a* and 21*b*-24*b* is the same, which results in a simple design of the fixing device 6. Both lift devices are controlled together in order to ensure that both lift devices run synchronously.

It is only possible to control the two lift devices when the first fixing device 6 is to be unlocked. As soon as the pawls 6*a*5 and 6*b*5 of the first fixing device 6 can engage in the recesses 4*a*1, 4*b*1 of the rails 4*a*, 4*b*, the pawls 6*a*5, 6*b*5 can, if the lift apparatuses or the lifting cylinders 21*a*, 21*b* run freely, engage in the recesses 4*a*1, 4*b*1 of the rails 4*a*, 4*b* without an actuation of the lifting cylinders 21, 21*b*. This way, the energy required to operate the first fixing device 6 can be reduced compared to a control in the unlocking position PE and the locking position PV of the first fixing device 6.

The first fixing device 6 shown in FIG. 5*a*, 5*b* can also be designed and used as a second fixing device 7. It is advantageous if the first and the second fixing devices 6, 7 are designed in a corresponding or the same form in order to implement a simple and reliable lift drive, according to the invention. In the first fixing device 6 shown in FIG. 5*a*, 5*b*, the second connecting element 15 is used to attach the fixing device to the frame base 3*d*, and the first connecting plates 11 are used to attach the fixing device to the first end of the lift device 5. The first fixing device 6 can be used as a second fixing device 7, wherein both fixing devices then are aligned with each other rotated by 180° in the X/Z plane.

Figures 6A, 6B, 6C:
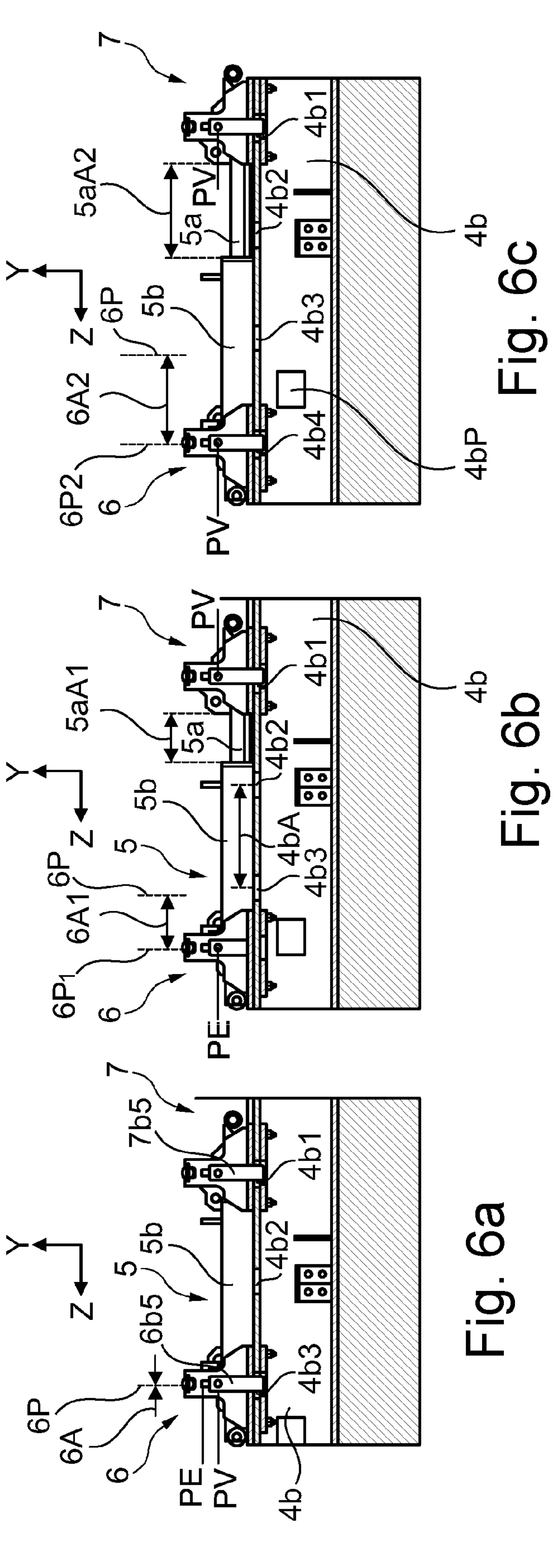
FIG. 6a-c is the lift drive according to the invention shown in FIG. 2b in a lateral cross-sectional view with a retracted lift device and locked fixing devices (a) with a partially extended lift device and unlocked fixing device at the end of the lift device to which the main frame is attached (b) and with an extended lift device and locked fixing devices (c)

FIG. 6*a* shows the lift drive according to the invention shown in FIG. 2*b* in a lateral cross-sectional view with the lift device 5 retracted and the fixing devices 6, 7 locked. The cross-sectional view corresponds to the cross-sectional view in FIG. 3*a*, 3*b*, and in addition to the pawl 6*b*5 of the further first fixing component 6*b* of the first fixing device 6, the pawl 765 of the further second fixing component 7*b* of the second fixing device 7 is shown. Both pawls are in the negative Y direction in the locking position PV, which causes both ends of the lift device 5 to be fixed on the lifting cylinder 5*b* on the rail 4*b*. Since, via the web 8, the pawl 6*a*5 of the first fixing component 6*a* of the first fixing device 6 and the pawl 7*a*5 of the second fixing component 7*a* of the second fixing device 7 are also in the locked position, the lift device 5 is fixed to the rails 4*a* and 4*b* via four pawls, with the first and second fixing devices 6, 7 each being releasably attached to the rails 4*a*, 4*b* with two pawls in a reversible manner. The rail 4*b* comprises the recesses 4*b*1-4*b*4, with the pawl 6*b*5 of the first fixing device 6 engaging in the recess 4*b*3 and the pawl 7*b*5 of the second fixing device 7 engaging in the recess 4*b*1 in the locked or attached state. Via the first fixing device 6, the main frame 3 is connectable and connected to the first end of the lift device 5 via its frame base 3*d*. The first fixing device 6 is connected to the first end of the lift device 5 in such a way that the first end of the lift device 5 can be fixed to the rail 4*b* via the first fixing device 6, and, in the Z direction, a position 6P of the first fixing device 6 relative to the rail 4*a*, 4*b* corresponds to a position of the first end of the lift device 5. For this purpose, it is defined below that the first end of the lift device 5 is located in an X/Y plane at the level of the position 6P of the web 8 in the Z direction. This definition is supported, for example, by FIGS. 4*b* and 5*b*, in each of which it is shown that the bolt 12 for connecting the first end of the lift device 5 in the X/Y plane is approximately at the level of the web 8 in the Z direction. A corresponding definition applies to a position 7P, 7P2, 7P3 of the second fixing device. In another embodiment, the first end of the lift device 5 can be offset from the web 8 in the longitudinal direction of the rail 4*a*, 4*b* and/or in the direction transversely to the longitudinal direction facing away from the rail 4*a*, 4*b*. The frame base 3*d* and thus the main frame 3 can be connected to the first fixing device 6 in the Z direction. In the starting position 6P, there is no displacement 6A of the first fixing device 6, and thus also no displacement of the first end of the lift device 5, and no movement of the main frame 3 relative to the rails 4*a*, 4*b* in their longitudinal direction.

In FIG. 6*b*, the lift drive from FIG. 6*a* is shown at a later point in time compared to the state of the lift drive in FIG. 6*a*. A piston 5*a* of the lift device 5 is partially extended relative to the lifting cylinder 5*b* with a displacement of the length 5*a*A1. Since the first fixing device 6 is in the unlocked state relative to the rails 4*a*, 4*b* according to the unlocking position PE of the pawl 6*b*5 and the second fixing device 7 is still in a locked state according to the locking position PV of the pawl 765, the lifting movement of the lift device 5 with the displacement length 5*a*A1 leads to a displacement 6A1 of the first fixing device 6. The displacement length 5*a*A1 therefore corresponds to the movement 6A1 of the first end of the lift device 5 and the main frame 3 and thus the cantilever construction device 2 in the longitudinal direction of the rails 4*a*, 4*b* in the Z direction. The position of the first fixing device 6 has therefore shifted from the position 6P to the new position 6P1 in the Z direction. A distance 4*b*A between the adjacent recesses 4*b*2, 4*b*3 in the rail 4*b* is greater than the displacement length 5*a*A1, and the pawl 6*b*5 cannot engage in a further recess in the rail 4*b* that is spaced by the distance 4*b*A from the recess 4*b*3 into which the pawl 6*b*5 in the initial state has engaged in position 6P. By extending the lift device 5 with the displacement length 5*a*A1, the main frame 3 attached to the first end of the lift device 5 is moved in the Z direction relative to the rail 4*b* in its longitudinal direction by the displacement 6A1.

In FIG. 6*c*, the lift drive according to the invention with a substantially completely extended lift device 5 and locked fixing devices 6, 7 is shown at a later point in time compared to the state of the lift drive in FIG. 6*b*. The substantially complete displacement length 5*a*A2 corresponds at least to the distance 4*b*A between adjacent recesses 4*b*2, 4*b*3 in the rail 4*b*, and due to the engagement of the pawl 6*b*5 in the recess 4*b*4 adjacent to the recess 4*b*3, the first fixing device 6 is displaced by the distance 4*b*A to the starting position 6P which corresponds to a displacement 6A2 of the first fixing device 6. The position 6P2 of the first fixing device 6 is consequently in the X/Y plane, in which the center of the recess 4*b*4 in the rail 4*b* lies, in which the pawl 6*b*5 engages. The pawl 6*b*5 is in the locking position PV, and the first fixing device 6 is, like the second fixing device 7, attached to the rail 4*b*. Compared to the initial state of the lift drive in FIG. 6*a*, the first end of the lift device 5 and thus the main frame 3 and thus the cantilever construction device 2 is moved by the displacement 6A2 in the longitudinal direction of the rail 4*a*, 4*b*, i.e., in the Z direction. According to the locking position PV of the pawl 7*b*5, the position of the second fixing device 7 has remained unchanged relative to the rail 4*b* during the displacement of the first fixing device 6 from position 6P to 6P2.

Figure 7A:
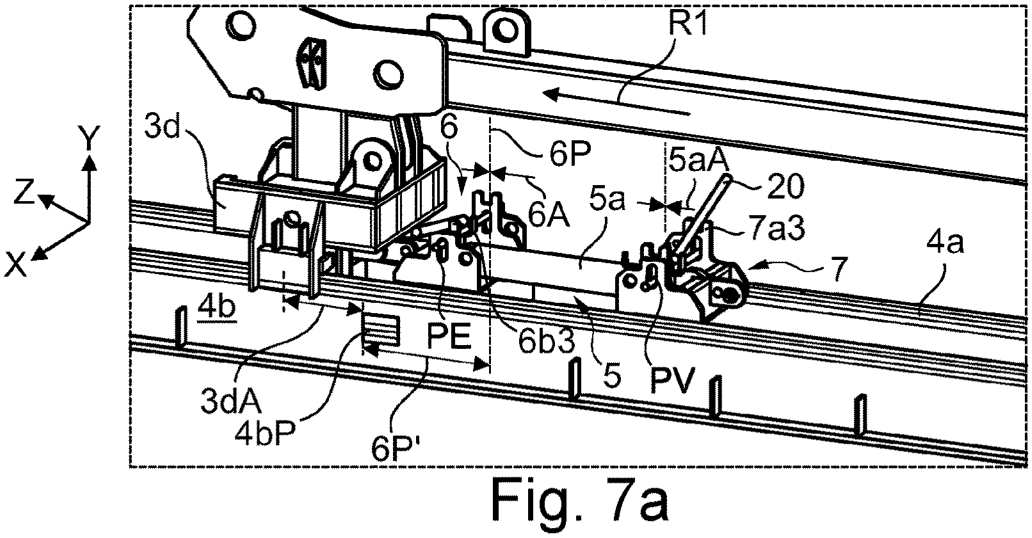
FIG. 7a-c are the lift drives, according to the invention, shown in FIG. 6a-c each in a spatial external view with the difference that the fixing device is unlocked in FIG. 7a at the end of the lift device to which the main frame is attached.
Figure 7B:
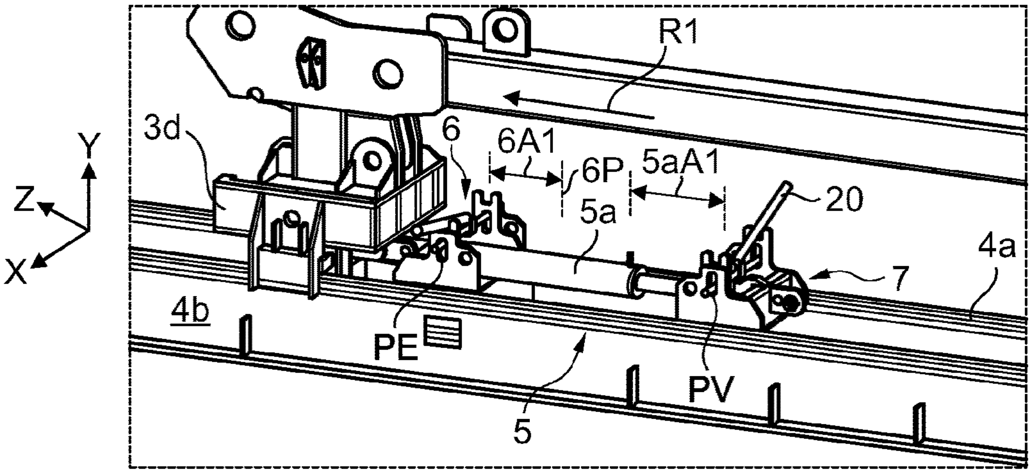
Figure 7C:
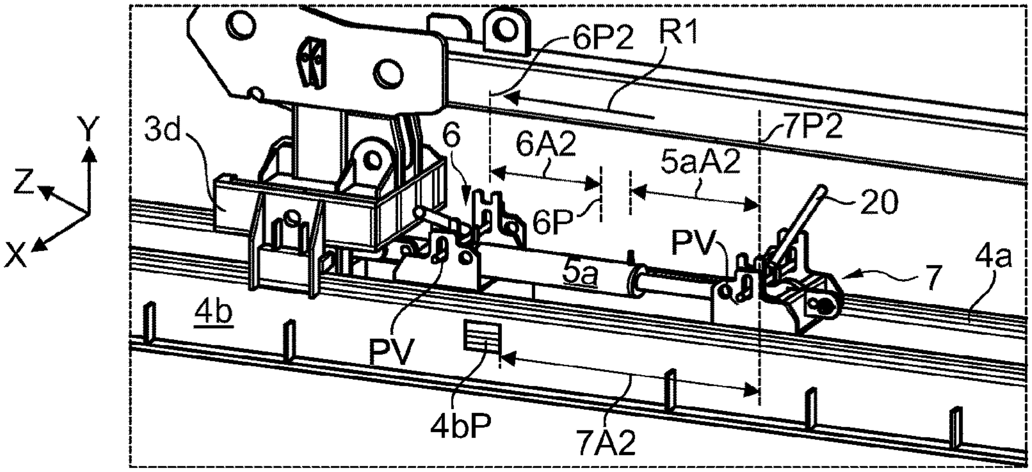

In FIGS. 7*a* to 7*c*, the states of the lift drive according to the invention shown in FIG. 6*a*-6*c* are each represented in a spatial external view. A difference between the state of the lift drive in FIGS. 6*a* and 7*a* is that, in contrast to the locked state of the first fixing device 6 in FIG. 6*a*, the first fixing device 6 in FIG. 7*a* is unlocked and is in the unlocking position PE. The frame base 3*d* adjoins the first fixing device 6 in the Z direction and is attached to the same. The first and second fixing devices 6, 7 each include the toggle lever 20 for a manual locking and unlocking of the respective fixing device 6, 7. FIG. 7*a* shows the starting positions 6P without the displacement 6A of the first fixing device 6 when the lift device 5 is retracted and without the displacement length 5*a*A. The frame base 3*d* is spaced from an edge of the marking 4*b*P of the rail 4*b* by the frame base distance 4*b*P in the longitudinal direction of the rail 4*b*. The starting position 6P of the first fixing device 6 is spaced from the edge of the marking 4*b*P in the longitudinal direction of the rail 4*b* by the distance 6P'.

In FIG. 7*b*, the lift device 5 is extended by the displacement length 5*a*A1 with the second fixing device 7 fixed on each of the rails 4*a*, 4*b*. In FIG. 7*c*, the first fixing device 6 is displaced from the starting position 6P into the new position 6P2 by the displacement 6A2 in the longitudinal direction of the rails 4*a*, 4*b* in the Z direction. While the position 6P of the first fixing device 6 of the lift drive in FIG. 7*a* has shifted by the displacement 6A2 into the new position 6P2 in the longitudinal direction of the rails 4*a*, 4*b*, i.e., in the direction R1, the position 7P2 of the second fixing device 7, which is spaced apart by the distance 7*a*2 from the edge of the marking 4*b*P in the longitudinal direction of the rail 4*b* in the negative Z direction, has remained unchanged in FIG. 7*c* with respect to the retracted state of the lift device 5 in FIG. 7*a*. While the toggle lever 20 of the first fixing device 6 is guided onto the first guide plate 6*b*3 in the X direction, the toggle lever 20 of the second fixing device 7 is guided onto the first guide plate 7*a*3 in the negative X direction. As an alternative to the lift drive according to the invention as shown in FIGS. 7*a* to 7*c*, the toggle lever 20 for both fixing devices 6, 7 can be located in the X direction or in the negative X direction.

Figure 7D:
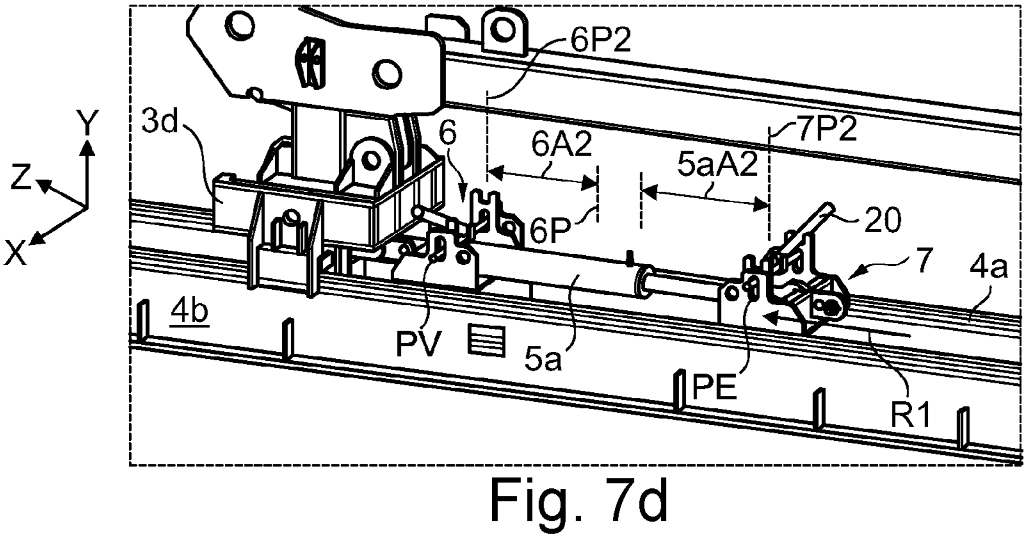
FIG. 7d-f is the lift drive, according to the invention, shown in FIG. 2b in a spatial external view with a locked fixing device at the end of the lift device, to which the main frame is attached, and an extended lift device (a) and a partially retracted lift device (b), and with a retracted lift device and locked fixing devices (c)
Figure 7E:
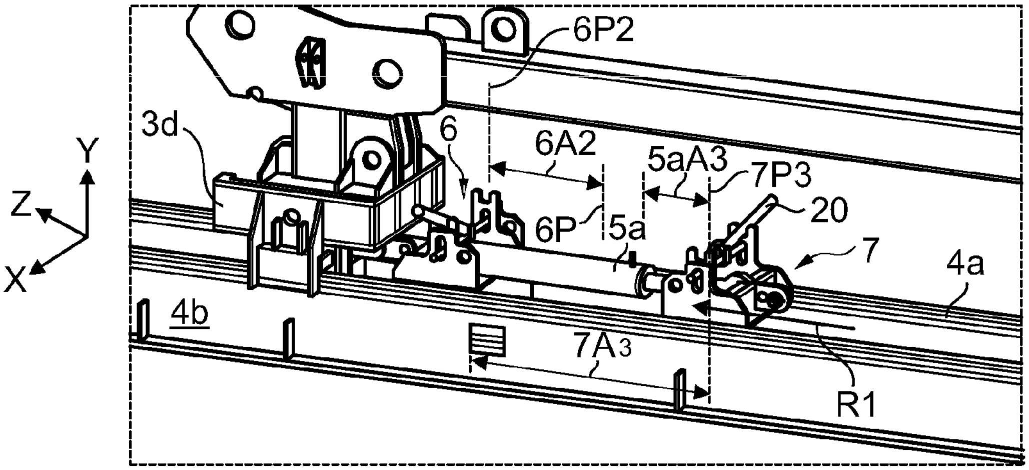
Figure 7F:
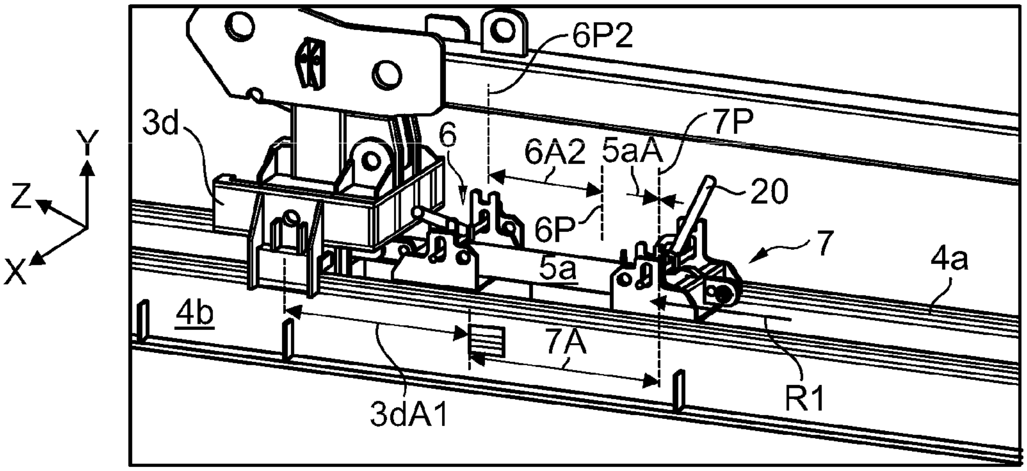

In contrast to the states of the lift drive according to the invention shown in FIGS. 7*a* to 7*c*, the first fixing device 6 in each of FIGS. 7*d* to 7*f* is at rest relative to the rails 4*a*, 4*b* and the second fixing device 7 is displaced in the Z direction relative to the rails 4*a*, 4*b* in the longitudinal direction of the rails 4*a*, 4*b*. In FIG. 7*d*, the lift device 5 is fully extended by a displacement length 5*a*A2 so that the first fixing device 6 is in the position 6P2. The first fixing device 6 is locked and attached to the rail 4*b* so that the first fixing device 6, the first end of the lift device 5 and the frame base 3*d* and thus the cantilever construction device 2 remain at rest relative to the rails 4*a*, 4*b*. The second fixing device 7 is unlocked and therefore movable in the R1 direction in the Z direction.

In FIG. 7*e*, with the position 6P2 of the first fixing device 6 being unchanged, the lift device 5 is partially retracted so that a shorter displacement length 5*a*A3 results with respect to the displacement length 5*a*A2 when the lift device 5 is fully extended. The partially retracted lift device, which is fixed at the first end of the lift device on the rail 4*b*, leads to a position 7P3 of the second fixing device which is shifted relative to the position 7P2 when the lift device 5 is fully extended in the direction R1, i.e., in the Z direction.

In FIG. 7*f*, the lift device 5 is completely retracted without a lift, as can be seen from the non-existent displacement length 5*a*A. The second fixing device 7 is spaced apart from the edge of the marking 4*b*P by the distance 7Aa in the longitudinal direction of the rail 4*b* in the negative Z direction. Relative to the lifting cylinder 5*a*, the piston 5*b* is moved in the negative Z direction during the extension movement of the lift device 5 (see FIG. 7*b*). In contrast to this, the piston 5*b* is moved in the Z direction relative to the lifting cylinder 5*a* when the lift device 5 is retracted (see FIG. 7*e*). While the second fixing device 7 is resting relative to each of the rails 4*a*, 4*b*, an extension of the lift device 5 leads to a displacement of the frame base 3*d* and thus the cantilever construction device 2. During the retraction of the lift device 5, the first fixing device and thus the frame base 3*d* and the cantilever construction device 2 are fixed relative to each of the rails 4*a*, 4*b*, and the lift device can be fully retracted in order to be able to start the next extension process.

A comparison between the states of the lift drive in FIGS. 7*a* and 7*f* shows that the frame base 3*d* and thus the cantilever construction device 2 is displaced by a difference 3*d*A1-3*d*A in the longitudinal direction of the rail 4*a*, 4*b*, i.e., in the Z direction, with this difference corresponding to the displacement 6A2 of the first fixing device 6 and the substantially entire displacement length 5*a*A2. The extension and retraction cycle of the lift drive, according to the invention, with the lift device 5 and the first and second fixing devices 6, 7 shown in FIG. 7*a-f* is repeated until a predetermined displacement of the cantilever construction device in the forward or backward direction is achieved. Instead of an extension that is performed when the first fixing device 6 is fixed, a displacement of the cantilever construction device 2 can also be achieved by a retraction of the lift device when the second fixing device 7 is fixed.

Figure 8B:
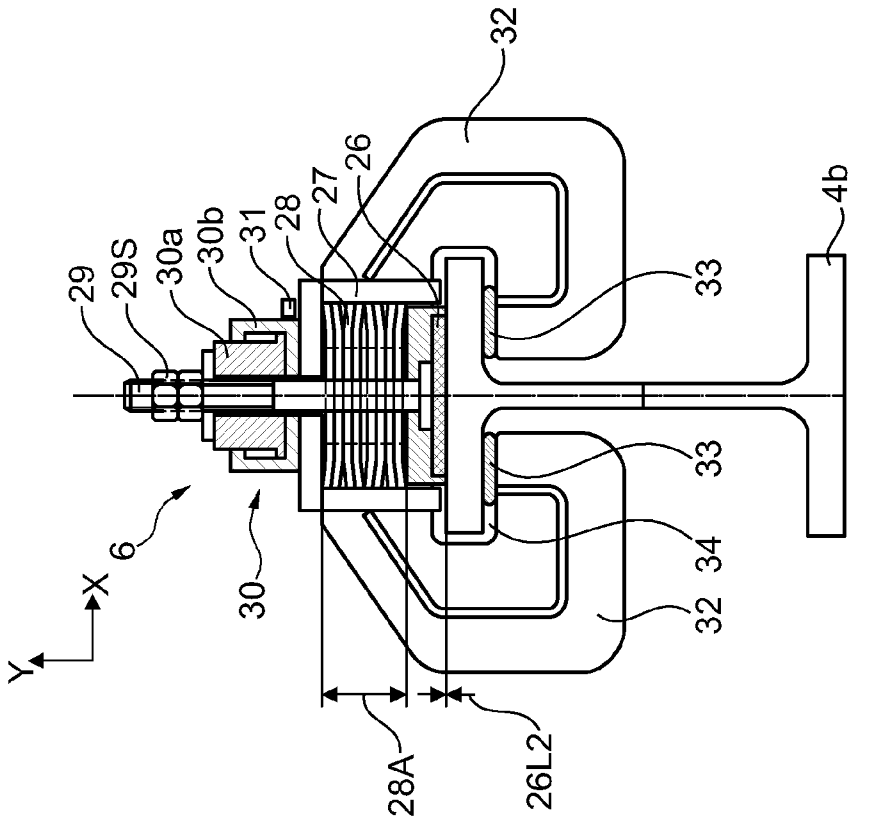
FIG. 8a, b is a fixing device with a positive fixation at one end of the lift device in a lateral cross-sectional view in the unlocked (a) and the locked (b) state relative to the rail according to a first embodiment of the invention.
Figure 8A:
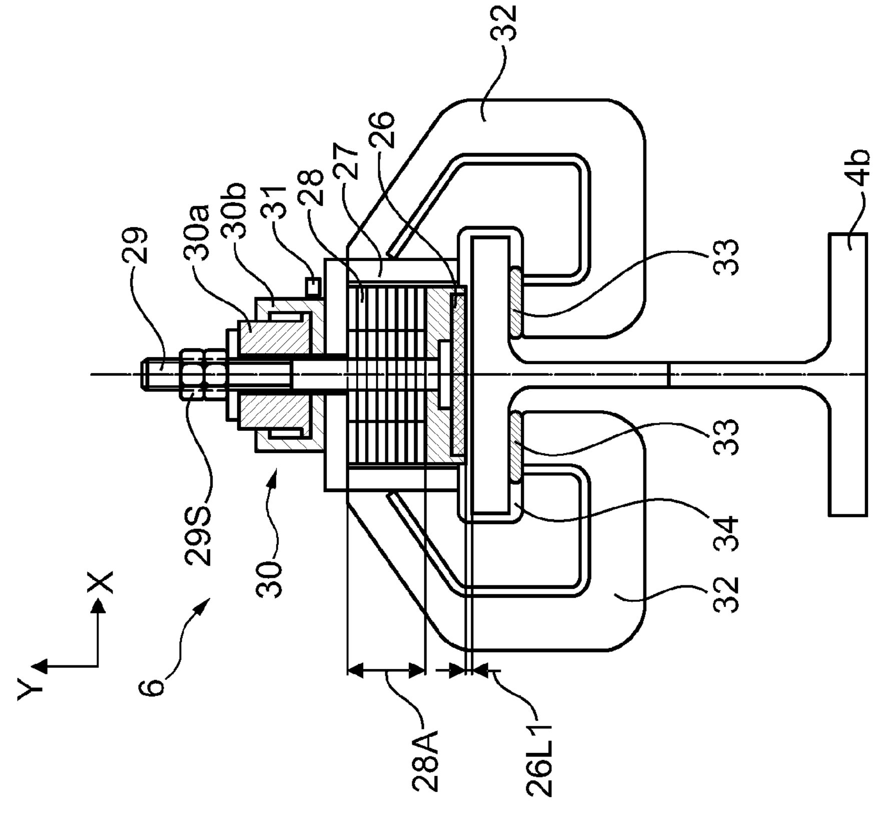

FIG. 8*a* shows a fixing device 6 with a positive fixing achieved by means of a fixing layer 26 at one end of the lift device 5 (not shown) in a lateral cross-sectional view in the unlocked state in the unlocking position PE. An elastic means 28 in the form of several leaf or disk springs is arranged in an elastic means housing 27. The elastic means has a spring force of 300 kN, for example. The elastic means housing 27 is connected to a guide housing 34 which engages around an upper part of the double-T-shaped rail 4*b* and is moveable relative to the rail 4*b* in the Z direction (out of the plane of the sheet). In the lower region of the guide housing 34, counter-pressure fixing layers 33 are arranged which, when the fixing layer 26 rests in the negative X direction on the rail 4*b*, provide counterpressure in the positive Y direction to fix the fixing device 6 on the rail 4*b*.

To increase the stability and thus the counterpressure of the counterpressure fixing layers 33, the counterpressure fixing layers and/or the guide housing are connected to the elastic means housing 27 via counterpressure arms 32. The elastic means 28 is connected to the fixing layer 26 in the form of a brake lining via a pretensioning means 29 and a pretensioning fixing means 29S. An unlocking lift device 30, which comprises an unlocking lift device piston 30*a* and an unlocking lift device cylinder 30*b*, is arranged between the pretensioning fixing means 29S and an upper side of the elastic means housing 27. The unlocking lift device comprises an unlocking lift device connection 31 on the lifting cylinder 30*b* for a connection to a hydraulic line. In the unlocking position PE, a depth 28*a* of the elastic means 28 is, for example, 85.6 mm, which leads to an air gap 26L1 between an underside of the fixing layer 26 and an upper side of the rail 4*b* of, for example, 7 mm. In FIG. 8*a*, the piston 30*a* of the unlocking lift device 30 is extended in such a way that the elastic means 28 is compressed in the Y direction, and the fixing layer 26 is thereby lifted off the rail 4*b* so that the air gap 26L1 is formed. In the unlocked position, the fixing device 6 can therefore be displaced with respect to the rail 4*b* in the Z direction or in the negative Z direction.

In FIG. 8*b*, the fixing device 6 from FIG. 8*a* is shown in the locking position PV. The air gap 26L2 is 0 mm, which leads to an expansion of the depth 28A of, for example, 92.6 mm compared to the depth 28A in FIG. 8*a* of, for example, 85.6 mm.

Figure 9:
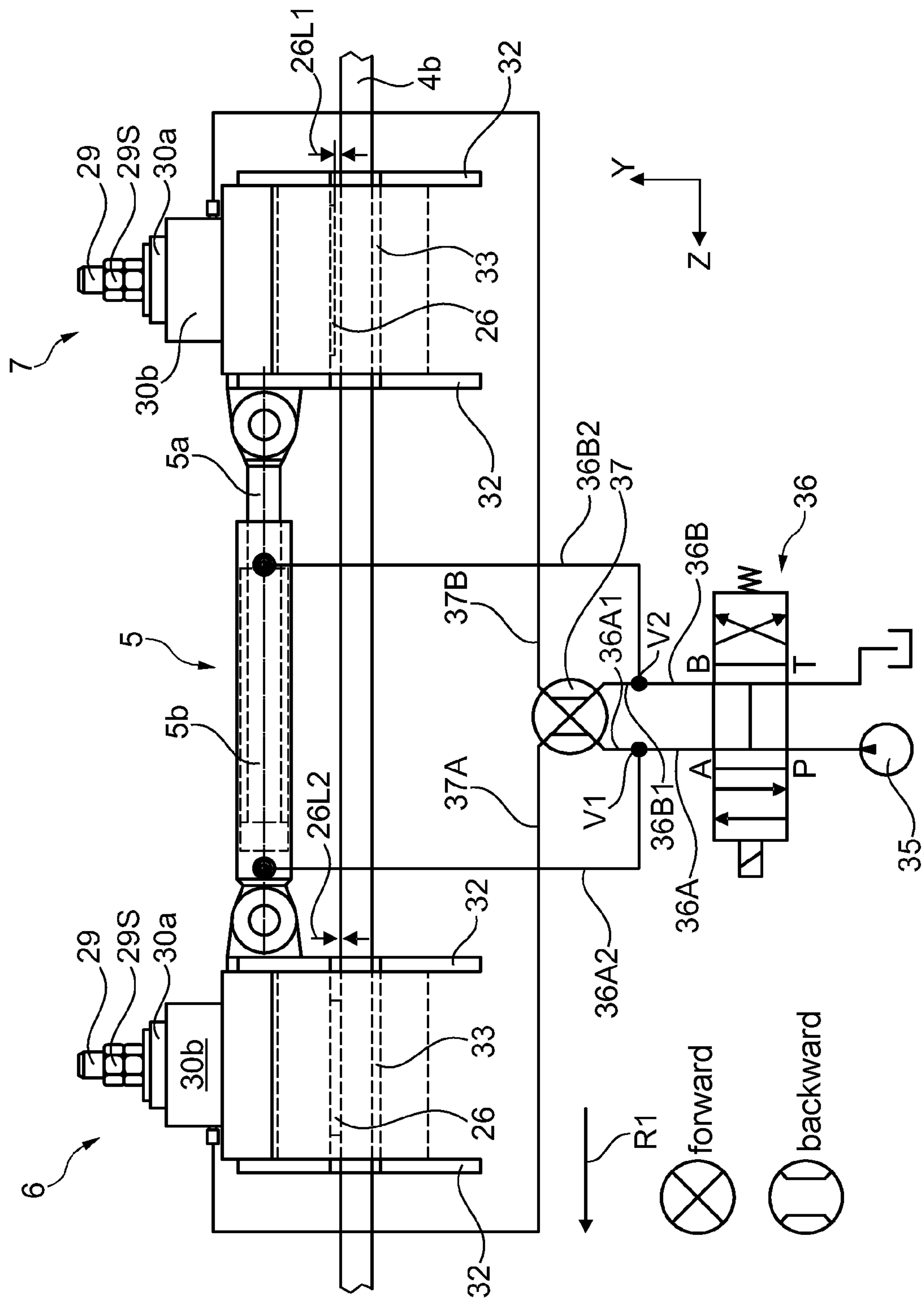
FIG. 9 is the lift drive, according to the invention, with a lift device and fixing devices according to the fixing apparatus shown in FIG. 8a, b in a second embodiment.

FIG. 9 shows a lift drive, according to the invention, with two of the fixing devices 6, 7 shown in FIG. 8*a*, 8*b*, which are each arranged at one of the two ends of the lift device 5 with the piston 5*a* and the lifting cylinder 5*b*. The first fixing device 6 is in the locking position PV, and the second fixing device 7 is in the unlocking position PE (see PE in FIG. 8*a* and PV in FIG. 8*b*). The lift device 5 is designed as a double-acting lift device in such a way that the lift device 5 can both be extended via a hydraulic line and retracted via a further hydraulic line.

For this purpose, the lifting cylinder 5*b* of the lift device 5 is connected via a first port A and via a second port B of the lift device 5 to a pressure source 35 in the form of a hydraulic pressure source. In addition to the first and second ports A, B, a directional valve 36 in the form of a 4/3-way valve includes the further ports P and T in the form of a pressure port P and a tank port T. The directional control valve has three mechanically actuatable positions with port P being connected to port A in a first position and port T being connected to port B. Independently of this, there is, in a middle position between P and T, pressureless circulation such that that A and B are relieved toward a tank and, in addition to the unpressurized circulation, a floating position is assumed so that the directional control valve 36 can easily be actuated by an external force. In the third position, port P is connected to port B and port A is connected to port T independently of this. The port A is connected to a changeover valve 37 via a first connecting line 36*a* and a first changeover valve line 36A1. Port B is connected to the changeover valve 37 via a second connecting line 36*b* and a second changeover valve line 36B1. Via the changeover valve 37, the first changeover valve line 36A1 and the second changeover valve line 36B1 are connected with a line 37A to the first fixing device 6 and with a line 37*b* to the second fixing device 7, each by connecting to the port 31 of the unlocking lift devices 30 of the first and second fixing devices 6, 7.

Between the first connecting line 36*a* and the first changeover valve line 36A1, there is a first branch point V1 such that port A is not only connected to the changeover valve 37 but also to a first port of the lifting cylinder 5*b* via a first lift device line 36A2 for extending the piston of the lift device 5. Port B is connected via a second branch point V2 via the second connecting line 36*b* and the second line 36B2 of the lift device 5 to a second port of the lifting cylinder 5*b* of the lift device 5 for retracting the piston 5*a* of the lift device 5.

Depending on whether the cantilever construction device 2 is to be moved or fixed, the first fixing device 6 is unlocked, and the second fixing device 7 is locked, or vice versa. The locking and unlocking of the fixing devices 6, 7 takes place alternately in such a way that ports A and B on the lifting cylinder 5*b* are controlled such that the fixing device 6, 7 that must be locked for the displacement of the cantilever construction device 2 (not shown) is used for the extension or retraction of the piston 5*a*. Instead of moving forward in the forward direction R1 of the cantilever construction device 2, ports A and B of the fixing devices 6, 7 can be interchanged via the changeover valve 37 for a reverse travel in the negative R1 direction. This way, a shifting of the cantilever construction device 2 in the forward or reverse direction, i.e., in the positive or negative Z direction, is made possible in a simple manner while observing the existing safety requirements.

Figure 10:
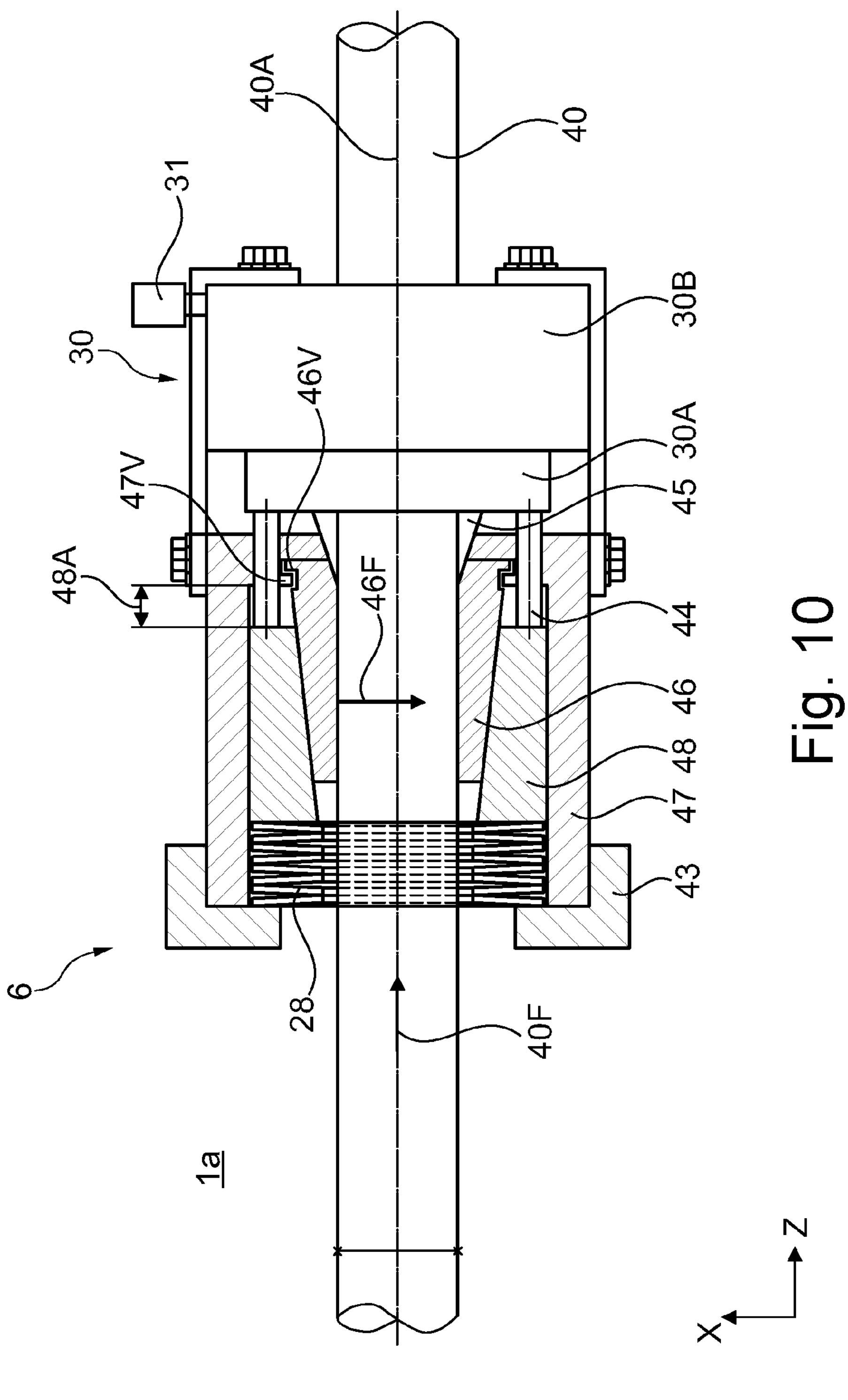
FIG. 10 is a fixing device which can be fixed on a fixing rail with a positive fixation in a plan view in the cross section according to a second embodiment of the invention.

FIG. 10 shows, in a cross-sectional plan view, a fixing device 6 with an axis 40A that can be fixed to a fixing rail 40 with a positive fixation by means of an application of one or more fixing elements 46 on a surface of the fixing rail 40. The fixing device 6, which can be fixed in a positive manner, comprises an elastic means frame 47 with an elastic means 28 in the form of one or more leaf or disc springs being arranged in the elastic means frame 47. The elastic means 28 can consist, for example, of eight disc springs with a spring force of 14 kN. Between the elastic means 28 and an unlocking lift device piston 30*a*, which is guided in an unlocking lift device lifting cylinder 30*b* of an unlocking lift device 30, a counter-pressure element 48 in the form of a conically shaped hollow cylinder, which is connected to the piston 30*a* of the unlocking lift device 30 via at least one connecting web 44, is arranged. In FIG. 10, the counter-pressure element is connected to the piston 30*a* of the unlocking lift device 30 via two connecting webs 44 for the introduction of the corresponding forces by the piston of the unlocking lift device 30.

When the piston 30*a* is extended via a port 31 of the unlocking lift device upon the actuation of the unlocking lift device 30, the connecting webs 44 press the counterpressure element against the elastic means 28, thus releasing at least one fixing element 46, which is arranged between the counterpressure element 48 and the fixing rail 40. For this purpose, a fixing element 46 shown in FIG. 10 above the fixing rail 40 in the form of a wedge can be moved in the positive X direction, and a further fixing element, which is different from the upper fixing element 46 and shown in FIG. 10 below the fixing rail 40, can be moved in the negative X direction when the piston 30*a* of the unlocking lift device 30 is extended. Here, compared to the retracted state of the piston 30*a*, a gap 48A between the counterpressure element 46 and the elastic means frame 47 increases. The fixing element 46 is guided by a projection 47V in the elastic means frame 47, which creates a recess in the elastic means frame 47, into which a projection 46V of the fixing element 46 can engage in such a way that, when the fixing device 6 is unlocked, the fixing element 46 cannot divert in the negative Z direction and can wedge itself between the fixing rail 40 and the counterpressure element 48.

For a better detachment of the fixing element 46 when the piston 30A is extended to unlock the fixing device 6, release elements 45 are arranged on the piston 30A next to the connecting webs 44, which engage between the respective fixing element 46 and a surface of the fixing rail 40 in order to detach the fixing element from the surface of the fixing rail 40 and to unlock the fixing device 6. Instead of a conically shaped hollow cylinder, the counterpressure element 48 can also consist of a plurality of wedge-shaped elements that are not directly connected to one another. The elastic means frame 47 has bases 43 on opposite sides of the fixing rail 40 in order to connect to one end of the lift device 5. The lifting cylinder 30*b* of the unlocking lift device 30 is connected to the elastic means frame 47 in such a way that when the piston 30A is extended, the piston 30A can move relative to the elastic means frame 47 (in the negative Z direction). In order to generate a fixing force with a fixing force direction 46F of, for example, 40 kN, a fixing force in the direction 46F, which is generated by the fixing element 46 due to its contact with the fixing rail 40 of, for example, 133 kN, can be generated with the arrangement of the fixing device 6 shown in FIG. 10. The gap between the counterpressure element 48 and the elastic means frame 47 can have a width of, for example, 20 mm. For example, the fixing element 46 can consist of three separate elements, in particular, arranged in an X/Y plane at angles of 120° to one another. When the unlocking lift device 30 is controlled hydraulically, a pressure of 180 bar can be applied to the port 31 of the unlocking lift device, for example. A fixing rail 40 with a round cross section can have a diameter of 60 mm, for example.

Figure 11:
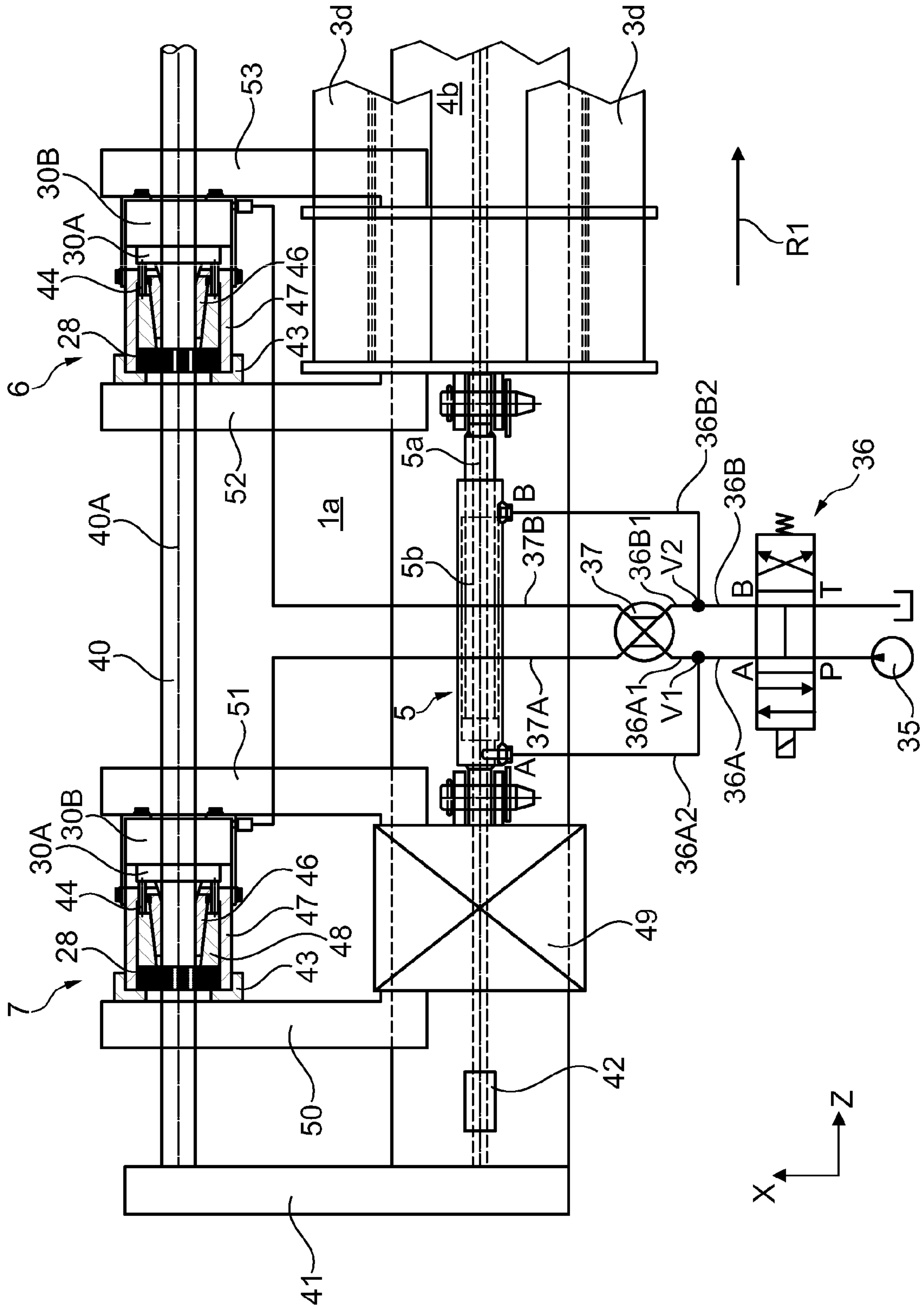
FIG. 11 is the lift drive according to the invention with a lift device and fixing devices according to the fixing apparatus shown in FIG. 10 in a second embodiment.

FIG. 11 shows a further embodiment of the lift drive, according to the invention, with the lift device 5 and fixing devices according to the fixing device 6 shown in FIG. 10 as fixing devices 6, 7. The hydraulic control of the fixing devices 6, 7 and the lifting cylinder 5*b* of the lift device 5 for extending or retracting the piston 5*a* corresponds to the hydraulic circuit shown in FIG. 9. Reference is therefore made to the description of the hydraulic circuit in FIG. 9 to explain the hydraulic circuit in FIG. 11.

In contrast to the arrangement shown in FIG. 9, the rail 4*b*, on which the lifting cylinder 5 and a latching head 49 are guided at one end of the lift device 5 and the frame base 3*d* is guided at an opposite end of the lift device 5, is connected to the fixing rail 40 via at least one connecting component 41. An axis 40A of the fixing rail 40 runs parallel to the rail 4*b* with the fixing rail 40 being connected to the rail 4*b* via the connecting component 41 in such a way that a fixing effect of one or both of the fixing devices 6, 7 leads to a fixing of the one and/or the other end of the lift device 5 with respect to the rail 4*b*. An additional fixing rail 40 attached to the rail allows the use of conventional lift drives for moving the rail-guided cantilever construction device 2 in which, on one end, the latching head 49, which is arranged relative to a latching device 42, is attached in such a way that, when the latching head 49 rests on the latching device 42, the cantilever construction device can be moved in the Z direction when the piston 5*a* is extended. Alternatively according to the invention, as shown in FIG. 10, the fixing device 7 can be fixed on the fixing rail 40 in the locking position PV when the piston 30*a* of the unlocking lift device 30 is retracted, and the fixing device 7 can pass its position, which is fixed with respect to the rail 4*b*, via a first coupling element 50 and a second coupling element 51 to the latching head 49 and thus to the one end of the lift device 5. For this purpose, one end of the first coupling element 50 is connected with the latching head and another end of the first coupling element 50 opposite the one end to the bases 43 of the fixing device 7. The lifting cylinder 30*b* of the fixing device 7 is connected to one end of a second coupling element 51, the other end of which is connected to the latching head 49. Correspondingly, the bases 43 of the fixing device 6 are connected to one end of the third coupling element 52 with another end opposite the one end being connected to the frame base 3*d*. One end of a fourth coupling element 53 is also connected to the frame base 3*d* with another end of the fourth coupling element lying opposite the one end being connected to the lifting cylinder 30B of the unlocking lift device 30 of the fixing device 6. As an alternative to this, each of the fixing devices 6, 7 can also be connected to one or the other end of the lift device 5 via just one coupling element. The two fixing devices 6, 7 each unlock and lock in order to move or brake or fix the cantilever construction device 2 (not shown). Via the fixing rail 40, which is connected to the rail 4*b* by means of the connecting component 41 or a plurality of connecting components 41, the fixing apparatuses 6, 7 can each develop their fixing/braking/or supporting effect at each of the two ends of the lift device 5 relative to the rail 4*b*.

The features of the invention described with reference to the illustrated embodiment, such as the manual lift device of the first fixing device 6 in FIG. 4*a*, 4*b*, can also be present in other embodiments of the invention, such as the hydraulic lift device of the first fixing device 6 in FIG. 5*a*, 5*b*, in such a way that the first fixing device comprises both a manual and a hydraulic lift device unless otherwise stated or impossible for technical reasons.

LIST OF REFERENCE SIGNS

1 Bridge
1*a* Bridge surface
1*b* Bridge hollow box
2 Cantilever construction device
3, 3' Main frame
3" Upper support arrangement
3'" Lower support arrangement
3*a*-3*c*, 3'*a*-3'*c* Strut
3*d*, 3'*d* Frame base

3*d*A, 3*d*A1 Displacement of the cantilever construction device
Q1, Q2, Q3 Cross strut
4*a*, 4*b*, 4'*a*, 4'*b* Rail
4*a*1, 4*b*1-4*b*4 Rail recess
4*b*' Wide rail recess
4*b*P Rail marking
5, 5' Lift device
5*a* Piston
5*b* Lifting cylinder
6 First fixing device
6*a*, 6*b* First fixing component
6*a*1, 6*b*1 Base plate
6*a*2, 6*b*2 Holding plate
6*a*3, 6*b*3, 7*a*3 First guide plate
6*a*4, 6*b*4 Second guide plate
6*a*5, 6*b*5, 7*b*5 Latching/snap-in element
6*b*' Wide pawl
6*b*' Wide base plate recess
6*b*''' Wide holding plate recess
6*a*3' First guide plate recess
6P, 6P1, 6P2 Position of the first fixing device relative to the rail
6A, 6A1, 6A2 Displacement position of the first fixing device relative to the rail
7 Second fixing device
7*a*, 7*b* Second fixing component
7*a*3 First guide plate
7P, P2, 7P3 Position of the second fixing device relative to the rail
7A, 7A2, 7A3 Displacement position of the second fixing device relative to the rail
8 Web
9 First connecting element
10 First connecting plate1
11 Second connecting plates
12 Bolt
13 Locking pin
14 Third connecting plates
15 Second connecting element
16 Through hole
18 Clamp
18' Position of the clamp relative to the web
19 Clamp recess
19', 19" Guide means
20 Toggle lever
21*a*, 21*b* Lifting cylinder of the lift device
22*a*, 22*b* Base plate mount
23*a*, 23*b* Second flange of the lift device
24*a*, 24*b* First flange of the lift device
25*a* Through hole of the base plate mount
26 Fixing layer
26L1 Air gap in the unlocking position
26L2 Air gap in the locking position
27 Elastic means housing
28 Elastic means
28A Elastic means depth
29 Pretensioning means
29S Pretensioning fixing means
30 Unlocking lift device
30*a* Piston of the unlocking lift device
30*b* Lifting cylinder of the unlocking lift device
31 Unlocking lift device port
32 Counterpressure arm
33 Counterpressure fixing layer
34 Guide housing
35 Pressure source
36 Directional control valve
36A First connecting line
36B Second connecting line
36A1 First changeover valve line
36B1 Second changeover valve line
36A2 First lift device line
36B2 Second lift device line
37 Shuttle valve
37A First lift device line
37B Second lift device line
40 Fixing rail
40A Fixing rail axis
40F Braking force direction
41 Connecting component
42 Latching device
43 Base
44 Connecting web
45 Release element
46 Fixing element
46F Direction of the fixing force
46V Fixing element projection
47 Elastic means frame
47V Elastic means frame projection
48 Counterpressure element
48A Gap between the counterpressure element and the elastic means frame
49 Latching head
50 First coupling element
51 Second coupling element
52 Third coupling element
53 Fourth coupling element
A First lift device port
B Second lift device port
P Pressure port
PE Unlocking position
PV Locking position
PA Distance between unlocking and locking position
R1 Forward direction of the cantilever construction device
T Tank port
V1 First branch point
V2 Second branch point

The invention claimed is:

1. A lift drive for a rail-guided cantilever construction device, the cantilever construction device comprising a main frame guided by at least one rail for receiving at least one formwork, the main frame being configured to move, along the at least one rail, horizontally forward in a first direction or horizontally backward in a second direction opposite the first direction, comprising:

a lift device, wherein a first end of the lift device is configured to be connected to the main frame, and a second end of the lift device opposite the first end is movable relative to the main frame when the first end of the lift device is connected to the main frame;

a first fixing device connected to the first end of the lift device and configured to fix the first end of the lift device with respect to the at least one rail; and a second fixing device connected to the second end of the lift device and configured to fix the second end of the lift device with respect to the at least one rail, wherein the first and second fixing devices can each be releasably fixed with respect to the at least one rail in a reversible manner, wherein the lift device is configured to be fixed or attached by the first fixing device and/or the second fixing device with respect to the at least one rail, and, when the rail-guided cantilever construction device is connected to the first end of the lift device, the rail-guided cantilever construction device is safely movable in a direction of travel while independent movement of the rail-guided cantilever construction device in or against the direction of travel is prevented.

2. The lift drive, according to claim 1, in which the lift device is fixed with respect to the at least one rail in such a way that:

during a lifting movement of the first end of the lift device in a direction relative to the at least one rail, the second fixing device is fixed with respect to the at least one rail for the displacement of the main frame relative to the at least one rail, and during a lifting movement of the second end of the lift device in the one direction relative to the at least one rail, the first fixing device is fixed with respect to the at least one rail.

3. The lift drive according to claim 1, in which the main frame is guided by the at least one rail via a roller or antifriction bearing, and the first and second fixing devices are configured in a corresponding or identical form.

4. The lift drive according to claim 1, in which the first and second fixing devices can each be fixable with respect to the at least one rail by a positive and/or non-positive fit.

5. The lift drive according to claim 4, in which at least one of the fixing devices comprises at least one fixing layer or one fixing element to be applied to the at least one rail or the at least one fixing rail that is connected to the rail in the fixed state and in which an unlocking lift device is configured to interact with the fixing layer or the fixing element and an elastic means in such a way that the fixing layer or the fixing element rests against the at least one rail or the at least one fixing rail connected to the rail due to the elastic means in order to fix the fixing device when the unlocking lift device is retracted and/or is out of order.

6. The lift drive according to claim 4, in which at least one of the fixing devices comprises at least one latching/snap-in element in the form of a pawl or foldable latching lug, wherein the at least one rail or the at least one fixing rail comprises recesses and/or depressions in a longitudinal direction, into which the at least one latching/snap-in element can engage in order to fix the fixing device with respect to the at least one rail.

7. The lift drive, according to claim 6, in which a displacement length of the lift device is selected to be greater than or equal to a distance from the recesses and/or depressions located next to one another in the longitudinal direction of the at least one rail or the at least one fixing rail so that, when the fixing device is fixed with respect to the at least one rail, the displacement length is sufficient to move the main frame by the distance between the recesses and/or depressions located next to one another.

8. The lift drive according to claim 6, in which at least one of the first fixing device or the second fixing device comprises at least one manual, hydraulic, pneumatic or electromotive lift device for executing a linear translational movement, which is configured to ensure a reversible engagement of the at least one latching/snap-in element in the recess or the depression of the at least one rail or the at least one fixing rail.

9. The lift drive according to claim 8, in which the cantilever construction device is guided by two or four rails arranged parallel to one another and the first and second fixing devices each comprise one pawl per rail so that a total of two pawls of the first and second fixing devices is assigned each rail, and the lift drive of the cantilever construction device as a whole either comprises two rails and four pawls or four rails and eight pawls.

10. The lift drive, according to claim 9, in which the pawls of the respective first and/or second fixing devices of both rails, which are opposite one another in a direction perpendicular to the longitudinal direction of each rail are connected to one another via a web.

11. The lift drive according to claim 10, in which the at least one manual lift device comprises a rotatable toggle lever, in the form of a rod, shaft or a bar, one lever arm end of which is rotatably coupled to the web approximately centrally between the pawls that are opposite each other and perpendicular to the longitudinal direction of each rail, said lever arm end being formed to move the pawls of the first fixing devices of the two rails and/or of the second fixing devices of the two rails that are connected via the web in concert with each other.

12. The lift drive according to claim 10, in which at least one hydraulic, pneumatic or electromotive lift device is coupled to the web and formed to move the pawls of the first fixing devices of both rails and/or of the second fixing devices of both rails, which are connected via the web in concert.

13. The lift drive according to claim 8, comprising a controller configured such that the hydraulic or pneumatic lift device with an existing hydraulic or pneumatic assembly can be controlled in order to move the main frame by the lift device or to move an upper and/or lower support arrangement attached to the main frame relative to the main frame, or a hydraulic or pneumatic assembly that is separate from the existing hydraulic or pneumatic assembly.

14. The lift drive, according to claim 13, in which the controller is configured such that each latching/snap-in element can be controlled individually or a plurality of latching/snap-in elements of the first or second fixing devices can be controlled jointly via a hydraulic or pneumatic assembly.

15. The lift drive, according to claim 13, in which the controller is configured such that the locking/snap-in elements can be released from the at least one rail or the at least one fixing rail by the one or more hydraulic, pneumatic or electromotive lift device(s), and the locking/snap-in elements can be released independently by gravity and/or another force, thereby avoiding the actuation of the one or more hydraulic, pneumatic or electromotive lift device(s), into which the recesses and/or depressions of the at least one rail or the at least one fixing rail can engage.

16. The lift drive, according to claim 1, in which the lift device is configured as a hydraulic cylinder, spindle drive or rack and pinion drive, with the spindle or rack and pinion drive being driven, by an electric motor, actuator or linear drive.

17. A rail-guided cantilever construction device comprising a lift drive, according to claim 1.

* * * * *